United States Patent
Tamura et al.

(10) Patent No.: US 12,372,285 B2
(45) Date of Patent: Jul. 29, 2025

(54) DEVICE MANAGEMENT SYSTEM FOR INVERTER COMPRESSOR

(71) Applicant: Mitsubishi Electric Corporation, Tokyo (JP)

(72) Inventors: Yuki Tamura, Tokyo (JP); Nobukazu Kosone, Tokyo (JP); Keisuke Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 425 days.

(21) Appl. No.: 18/006,626

(22) PCT Filed: Sep. 28, 2021

(86) PCT No.: PCT/JP2021/035588
§ 371 (c)(1),
(2) Date: Jan. 24, 2023

(87) PCT Pub. No.: WO2022/065506
PCT Pub. Date: Mar. 31, 2022

(65) Prior Publication Data
US 2023/0296302 A1    Sep. 21, 2023

(30) Foreign Application Priority Data

Sep. 28, 2020   (WO) ................. PCT/JP2020/036576

(51) Int. Cl.
*F25B 49/02*     (2006.01)
*G05B 19/4155*   (2006.01)

(52) U.S. Cl.
CPC ........ *F25B 49/025* (2013.01); *G05B 19/4155* (2013.01); *F25B 2600/021* (2013.01);
(Continued)

(58) Field of Classification Search
CPC .............. F25B 49/025; F25B 2600/021; F25B 2600/0253; F25B 2700/151;
(Continued)

(56) References Cited

U.S. PATENT DOCUMENTS

| | | |
|---|---|---|
| 2010/0181861 A1 | 7/2010 | Takamatsu et al. |
| 2010/0187025 A1 | 7/2010 | Takamatsu et al. |
| 2021/0239342 A1 | 8/2021 | Tamura et al. |

FOREIGN PATENT DOCUMENTS

| | | |
|---|---|---|
| JP | 2002-248932 A | 9/2002 |
| JP | 2002-354841 A | 12/2002 |

(Continued)

OTHER PUBLICATIONS

English Translation of "JP-2019122076-A" (Year: 2019).*
(Continued)

*Primary Examiner* — Charles R Kasenge
(74) *Attorney, Agent, or Firm* — Posz Law Group, PLC

(57) ABSTRACT

A device management system for an inverter compressor is a device management system for an inverter compressor provided with a motor to be driven by an inverter, and includes: a partial discharge detector that detects a voltage of the motor to detect a partial discharge that occurs in the motor; and a determination module that determines whether there is a risk of occurrence of the partial discharge or whether the partial discharge occurs based on a result of detection by the partial discharge detector. When the voltage detected by the partial discharge detector is higher than a first threshold, the determination module determines that there is a risk of the occurrence of the partial discharge or the partial discharge occurs, and performs a protective operation to reduce the risk of the occurrence of the partial discharge in the motor or the occurrence of the partial discharge in the motor.

10 Claims, 13 Drawing Sheets

(52) U.S. Cl.
CPC . *F25B 2600/0253* (2013.01); *F25B 2700/151* (2013.01); *F25B 2700/1931* (2013.01); *F25B 2700/1933* (2013.01); *G05B 2219/45219* (2013.01)

(58) Field of Classification Search
CPC ...... F25B 2700/1931; F25B 2700/1933; F25B 49/005; F25B 13/00; G05B 19/4155; G05B 2219/45219; G05B 15/02; G05B 19/0428; G05B 2219/2654; H02H 7/085; H02H 7/0857; Y02B 30/70; F04C 28/28
See application file for complete search history.

(56) References Cited

FOREIGN PATENT DOCUMENTS

| | | |
|---|---|---|
| JP | 2006-288153 A | 10/2006 |
| JP | 2007-240160 A | 9/2007 |
| JP | 2008-209172 A | 9/2008 |
| JP | 2008-295255 A | 12/2008 |
| JP | 2009-011054 A | 1/2009 |
| JP | 2011-199965 A | 10/2011 |
| JP | 2012-019563 A | 1/2012 |
| JP | 2013-062890 A | 4/2013 |
| JP | 2013-223259 A | 10/2013 |
| JP | 2015-042076 A | 3/2015 |
| JP | 2017-083060 A | 5/2017 |
| JP | 2018-025372 A | 2/2018 |
| JP | 2019122076 A * | 7/2019 |
| WO | 2008/146767 A1 | 12/2008 |
| WO | 2019/239549 A1 | 12/2019 |

OTHER PUBLICATIONS

International Search Report of the International Searching Authority mailed Nov. 10, 2020 in corresponding International Application No. PCT/JP2020/036576 (and English translation).

International Search Report of the International Searching Authority mailed Nov. 9, 2021 in corresponding International Application No. PCT/JP2021/035588 (and English translation).

* cited by examiner

DEVICE MANAGEMENT SYSTEM FOR INVERTER COMPRESSOR

CROSS REFERENCE TO RELATED APPLICATION

This application is a U.S. national stage application of PCT/JP2021/035588 filed on Sep. 28, 2021, which claims priority to International Patent Application No. PCT/JP2020/036576 filed on Sep. 28, 2020, the contents of which are incorporated herein by reference.

TECHNICAL FIELD

The present disclosure relates to a device management system for an inverter compressor that is mounted, for example, in an air-conditioning apparatus.

BACKGROUND ART

In an inverter compressor mounted in an air-conditioning apparatus, a controller performs feedback control of an operating voltage and an operating current, thereby controlling a rotation speed depending on the situation of operation to obtain a required air-conditioning capacity.

Furthermore, in the inverter compressor, an upper limit value of allowable current is set in advance, and the controller thus performs control of operation of the inverter compressor under conditions based on the upper limit value. Thus, the controller is also intended to avoid situations of operation that lead to fatal failures such as damage of a compression mechanism unit of the inverter compressor, damage of a bearing, anomalous heating of a motor winding, and demagnetization of a permanent magnet of a motor.

As the control by the controller, for example, stall control and overcurrent cutoff control are present. In the stall control, when the inverter compressor enters high-load operation, the controller detects a rise in current that occurs in the high-load operation. Then, when a detected current value reaches a certain value, the controller reduces the rotation speed of the inverter compressor, thereby reducing the load on the inverter compressor to keep the inverter compressor operating. Furthermore, in the overcurrent cutout control, when the controller detects a sharp current rise that occurs because of locking of the inverter compressor, and a detected current value reaches a certain value, the controller causes the inverter compressor to stop the operation thereof.

In an inverter compressor incorporated in a refrigerant circuit of an air-conditioning apparatus, if a fatal failure such as damage of a compression mechanism unit, abnormal wear of a bearing, or motor burnout occurs, the failure in the inverter compressor may cause generation of a large amount of foreign matter such as bits of metal, abrasion powder, or carbides. In such a case, since the refrigerant circuit of the air-conditioning apparatus is a closed circuit, the large amount of foreign matter accumulates in the refrigerant circuit of the air-conditioning apparatus, as a result of which the entire refrigerant circuit may be damaged. If the entire refrigerant circuit is damaged, it needs to be repaired for a longer time of period, and a repair cost increases, thus causing a heavy loss on a user. In the related art, as a measure to collect such foreign matter in the refrigerant circuit, a strainer is provided in the refrigerant circuit; however, even in the case where the strainer is provided, it is impossible to completely prevent the refrigerant circuit from being damaged by the foreign matter, and in addition, it is hard to collect all the foreign matter. Furthermore, because of the addition of the strainer, the cost and the maintenance cost are increased. In view of the above, the following techniques are very important: a technique with which operation control is performed within a range of conditions in which the reliability of an inverter compressor can be ensured; and a technique with which stop control of the inverter compressor is performed immediately when actual conditions exceeds the range of the conditions. Thus, various proposals for achieving the above techniques have been made (see, for example, Patent Literature 1).

CITATION LIST

Patent Literature

Patent Literature 1: International Publication No. 2019/239549

SUMMARY OF INVENTION

Technical Problem

However, in general, in driving of an inverter, switching of a power device provided in the inverter causes generation of an impulse voltage (hereinafter referred to as "surge voltage"), called "inverter surge", which has a sharp rising edge. When this surge voltage exceeds a partial discharge inception voltage, which is one of the characteristic values of a motor, a partial discharge occurs in the motor. Since the partial discharge rapidly deteriorates an organic insulating material, the insulating coating of an enameled wire is broken in a comparatively short time, and this may finally lead to motor burnout.

There are several measures against surge voltage. One of the measures is a method using corona resistant wire made of a nanocomposite material. This method is intended to retard the progress of insulation deterioration by increasing the strength of the insulating coating of the enameled wire against the partial discharge, through the use of the corona-resistant wire. However, although the corona-resistant wire can retard the progress of insulation deterioration, it cannot stop insulation deterioration. Thus, the method finally causes dielectric breakdown and motor burnout. Furthermore, the corona-resistant wire undesirably costs more than a normal enameled wire.

Another measure which is well taken in view of the above is a method using an insulation structure (hereinafter referred to as "partial-discharge-free insulation structure") to which a measure against the partial discharge is applied. In the partial-discharge-free insulation structure, an insulation structure is reinforced by adding insulating paper or using an insulating varnish or mold. In the partial-discharge-free insulation structure, since the insulation structure is reinforced, the partial discharge inception voltage is made higher than the surge voltage. The partial-discharge-free insulation structure reduces the probability with which the surge voltage will exceed the partial discharge inception voltage, thus reducing the occurrence of a partial discharge.

In general, a motor mounted in an inverter compressor has a partial-discharge-free insulation structure, as it is required to have a long durable life. However, since a usage environment (i.e., temperature, pressure, refrigerant, refrigerating machine oil, and cleanliness) of the motor is severe, it is inevitable that insulation deterioration progresses with age. Therefore, there is a possibility that a partial discharge will occur, and break the insulation structure, thus causing a trouble such as motor burnout.

The present disclosure is applied to solve the above problem and relates to a device management system for an inverter compressor, which is capable of detecting a risk of occurrence of a partial discharge that occurs in a motor mounted in an inverter compressor or detecting the occurrence of the partial discharge.

Solution to Problem

A device management system for an inverter compressor according to an embodiment of the present disclosure is a device management system for an inverter compressor provided with a motor configured to be driven by an inverter. The device management system includes: a partial discharge detector configured to detect a voltage of the motor to detect a partial discharge that occurs in the motor; and a determination module configured to determine whether there is a risk of occurrence of the partial discharge or not, or whether the partial discharge occurs or not based on a result of detection by the partial discharge detector. When the voltage detected by the partial discharge detector is higher than a first threshold, the determination module determines that there is a risk of the occurrence of the partial discharge or the partial discharge occurs, and performs a protective operation to reduce the risk of the occurrence of the partial discharge in the motor or the occurrence of the partial discharge in the motor.

Advantageous Effects of Invention

The device management system for the inverter compressor, according to the embodiment of the present disclosure, is capable of detecting a risk of occurrence of a partial discharge that occurs in the motor mounted in the inverter compressor or the occurrence of the partial discharge, and performing a protective operation when the protective operation is needed.

DESCRIPTION OF EMBODIMENTS

A device management system for an inverter compressor 11 according to each of embodiments of the present disclosure will be described with reference to the drawings. The following descriptions concerning the embodiments are not limiting, and various modifications may be made without departing from the gist of the present disclosure. Furthermore, the present disclosure encompasses all combinations of combinable ones of configurations described regarding the following embodiments and modifications thereof. In addition, in each of figures to be referred to, components that are the same as or equivalent to those in a previous figure or previous figures are denoted by the same reference signs, and the same is true of the entire text of the specification. In each of the figures, for example, relative relationships in size between components, and the shapes of components may be different from actual ones.

Embodiment 1

A device management system for an inverter compressor according to Embodiment 1 will be described. The device management system for the inverter compressor is configured to detect risk of occurrence of a partial discharge that occurs in a motor mounted in the inverter compressor or occurrence of the partial discharge. The inverter compressor according to Embodiment 1 is a compressor provided with a motor 15 that is driven by an inverter.

Figure 1:
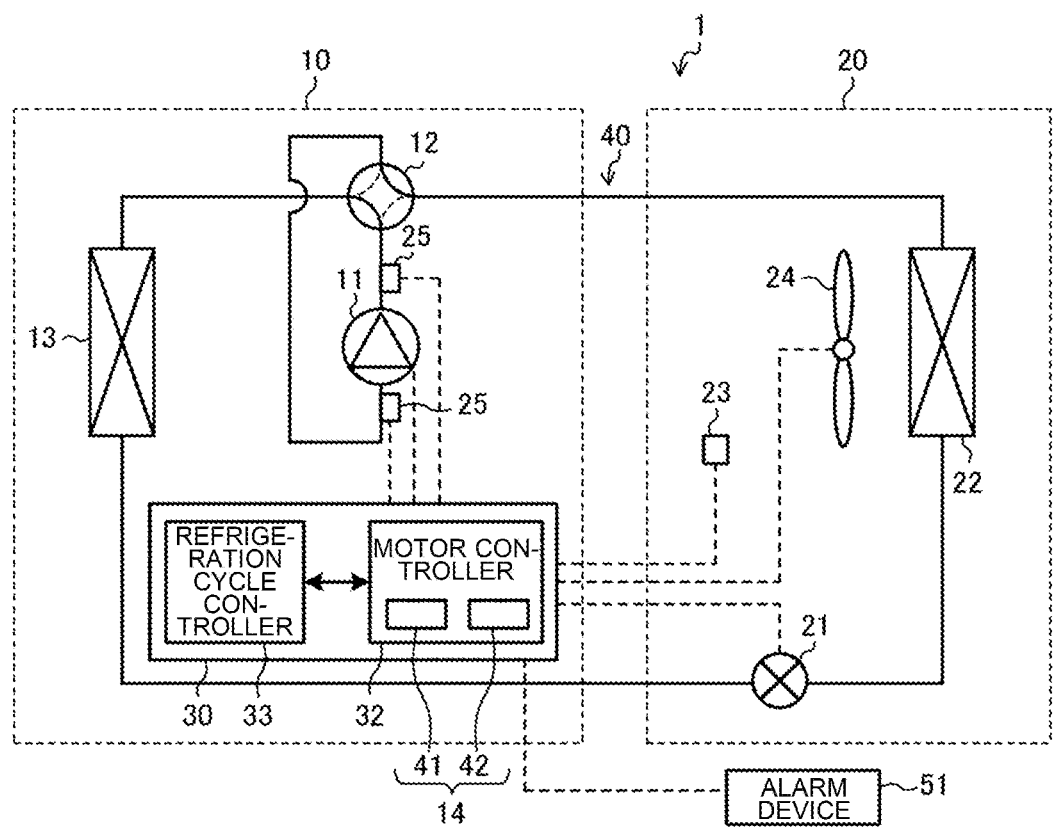
FIG. 1 illustrates a configuration example of a refrigeration cycle system 1 provided with an inverter compressor 11 according to Embodiment 1.

FIG. 1 illustrates a configuration example of a refrigeration cycle system 1 provided with an inverter compressor 11 according to Embodiment 1. As illustrated in FIG. 1, the refrigeration cycle system 1 includes a heat-source-side unit 10 and a load-side unit 20. The load-side unit 20 is installed in an indoor space to be air-conditioned. On the other hand, the heat-source-side unit 10 is installed outside the indoor space. The heat-source-side unit 10 is installed, for example, in an outdoor air environment. The refrigeration cycle system 1 is, for example, an air-conditioning apparatus, but is not limited to the air-conditioning apparatus.

The heat-source-side unit 10 includes the inverter compressor 11, a four-way valve 12, and a heat-source-side heat exchanger 13. The load-side unit 20 includes an expansion device 21 and a load-side heat exchanger 22. The inverter compressor 11, the heat-source-side heat exchanger 13, the expansion device 21, and the load-side heat exchanger 22 are connected by refrigerant pipes, whereby a refrigerant circuit 40 through which refrigerant circulates is provided. Although Embodiment 1 will be described with respect to the case where the inverter compressor 11 is mounted in the heat-source-side unit 10, this description is not limiting. Furthermore, although Embodiment 1 will also be described with respect to the case where the expansion device 21 is mounted in the load-side unit 20, this description is not limiting. That is, the expansion device 21 may be mounted in the heat-source-side unit 10.

Furthermore, the heat-source-side unit 10 is provided with a controller 30. As illustrated in FIG. 1, the controller 30 includes a motor controller 32 and a refrigeration cycle controller 33. The motor controller 32 controls operation of an inverter 43 (see FIG. 4), thereby controlling driving of a motor 15 (see FIG. 2) mounted in the inverter compressor 11. Furthermore, the refrigeration cycle controller 33 controls operation of the refrigeration cycle system 1. Specifically, the refrigeration cycle controller 33 controls, for example, a switching operation of the four-way valve 12, the opening degree of the expansion device 21, and the rotation speed of a fan 24 which will be described later. The controller 30 further includes a partial discharge detector 14 configured to detect risk of occurrence of a partial discharge that occurs in the motor 15 or occurrence of the partial discharge. The partial discharge detector 14 includes a voltmeter (voltage sensor) 41 and a current sensor 42. The partial discharge detector 14 measures a voltage and a current that are applied and supplied to the motor 15, using the voltmeter 41 and the current sensor 42. Although the partial discharge detector 14 may be incorporated in the motor controller 32 as illustrated in FIG. 1, the partial discharge detector 14 may be provided outside the motor controller 32 as illustrated in FIG. 3, which will be described later. The result of detection by the partial discharge detector 14 is sent to a determination module 36 (see FIG. 3) that is provided in the controller 30 and will be described later. Based on the result of detection by the partial discharge detector 14, the determination module 36 determines whether or not there is a risk of occurrence of a partial discharge or whether or not the partial discharge occurs. It should be noted that although it is described above that the partial discharge detector 14 detects both a voltage and a current, it is not limiting. The partial discharge detector 14 may be configured to detect at least one of a voltage and a current on an occasion arises. In that case, the partial discharge detector 14 may include only at least one of the voltmeter 41 and the current sensor 42.

An alarm device 51 is connected to the controller 30. The alarm device 51 issues an alarm that notifies a user of a risk of occurrence of a partial discharge or the occurrence of the partial discharge. The alarm device 51 includes, for example, a display device such as a display. The alarm device 51 is provided, for example, on a front panel or a side panel of a housing of the load-side unit 20. Furthermore, in the case where the refrigeration cycle system 1 includes a remote controller, the alarm device 51 may include a display provided at the remote controller. The alarm device 51 displays a message that, for example, "It is expected that a failure will occur", for the user. The way of indicating an alarm from the alarm device 51 is not limited to displaying of, for example, a text message on a screen. The alarm device 51 may output voice such as a voice message or an alarm sound. In that case, the alarm device 51 is a display device such as a display including a speaker. Thus, the alarm device 51 has a function of producing either a display output or a voice output or both the display output and the voice output.

Furthermore, the heat-source-side unit 10 is provided with one or more pressure sensors 25 that detect pressures of refrigerant in refrigerant pipes of the heat-source-side heat exchanger 13 and the load-side heat exchanger 22, etc. Referring to FIG. 1, two pressure sensors 25 are provided. One of the two pressure sensors 25 is provided adjacent to a suction port 11a (see FIG. 2) of the inverter compressor 11, and the other of the two pressure sensors 25 is provided adjacent to a discharge port 11b (see FIG. 2) of the inverter compressor 11. The refrigeration cycle controller 33 controls the pressure in the refrigerant circuit 40 based on values detected by these pressure sensors 25.

The load-side unit 20 includes a fan 24 and a room temperature sensor 23 that detects the temperature of the indoor space to be air-conditioned. The fan 24 sucks air from the indoor space and sends the air to the load-side heat exchanger 22.

Although Embodiment 1 will be described by referring to by way of example the case where the heat-source-side unit 10 is provided with the four-way valve 12, it is not indispensable that the four-way valve 12 is provided. Furthermore, the refrigeration cycle system 1 may be provided with a bypass circuit for defrosting operation.

Each of components of the refrigerant circuit 40 will be described.

The inverter compressor 11 is a variable capacity inverter compressor. The motor controller 32 controls the voltage, current, and rotation speed of the motor 15 (see FIG. 2) mounted in the inverter compressor 11, thereby regulating the discharge capacity of the inverter compressor 11. Using the turning force produced by the motor 15, the inverter compressor 11 sucks from the suction port 11a (see FIG. 2), refrigerant that flows in the refrigerant circuit 40, compresses the sucked refrigerant, and discharges the refrigerant from the discharge port 11b (see FIG. 2) toward the refrigerant circuit 40.

The four-way valve 12 is a flow switching device that switches a flow passage for refrigerant in the refrigerant circuit 40 between a plurality of flow passages, depending on an operation state of the refrigeration cycle system 1. When the operation state is cooling operation, the four-way valve 12 switches the flow passage for the refrigerant to a flow passage in which refrigerant discharged from the inverter compressor 11 flows through the heat-source-side heat exchanger 13. At this time, the heat-source-side heat exchanger 13 operates as a condenser, and the load-side heat exchanger 22 operates as an evaporator. By contrast, when the operation state is heating operation, the four-way valve 12 switches the flow passage for the refrigerant to a flow passage in which refrigerant discharged from the inverter compressor 11 flows through the load-side heat exchanger 22. At this time, the heat-source-side heat exchanger 13 operates as an evaporator, and the load-side heat exchanger 22 operates as a condenser.

The heat-source-side heat exchanger 13 causes heat exchange to be performed between outside air and refrigerant that flows in the heat-source-side heat exchanger 13. The heat-source-side heat exchanger 13 is, for example, a fin-and-tube heat exchanger. It should be noted that the heat-source-side unit 10 may further include a fan that sends air to the heat-source-side heat exchanger 13.

The expansion device 21 is a pressure reducing device that expands refrigerant. The expansion device 21 is, for example, an expansion valve such as an electronic expansion valve. The expansion device 21 is provided between the heat-source-side heat exchanger 13 and the load-side heat exchanger 22.

The load-side heat exchanger 22 causes heat exchanges to be performed between an indoor air and refrigerant that flows in the load-side heat exchanger 22. To the load-side heat exchanger 22, indoor air is sent by the fan 24. The load-side heat exchanger 22 is, for example, a fin-and-tube heat exchanger.

Figure 2:
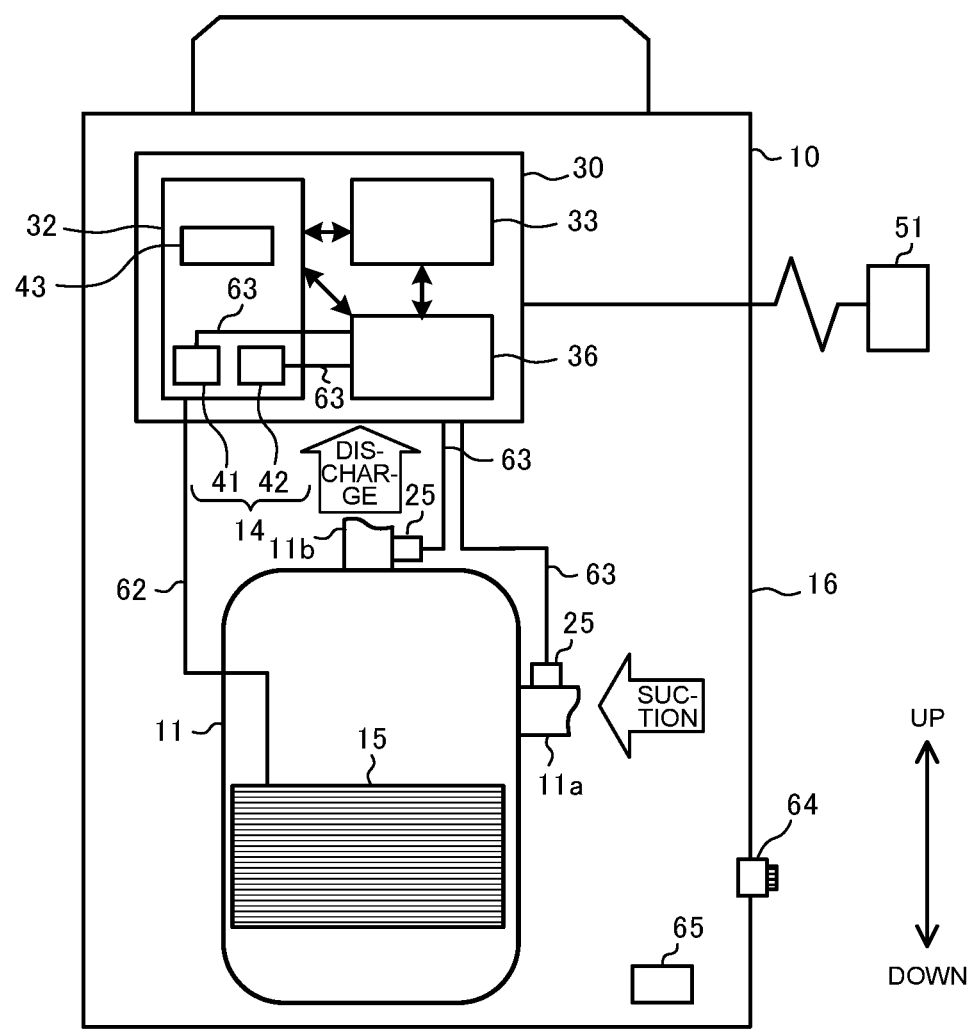
FIG. 2 is a schematic perspective view illustrating a configuration example of the inside of a heat-source-side unit 10 as illustrated in FIG. 1.
Figure 3:
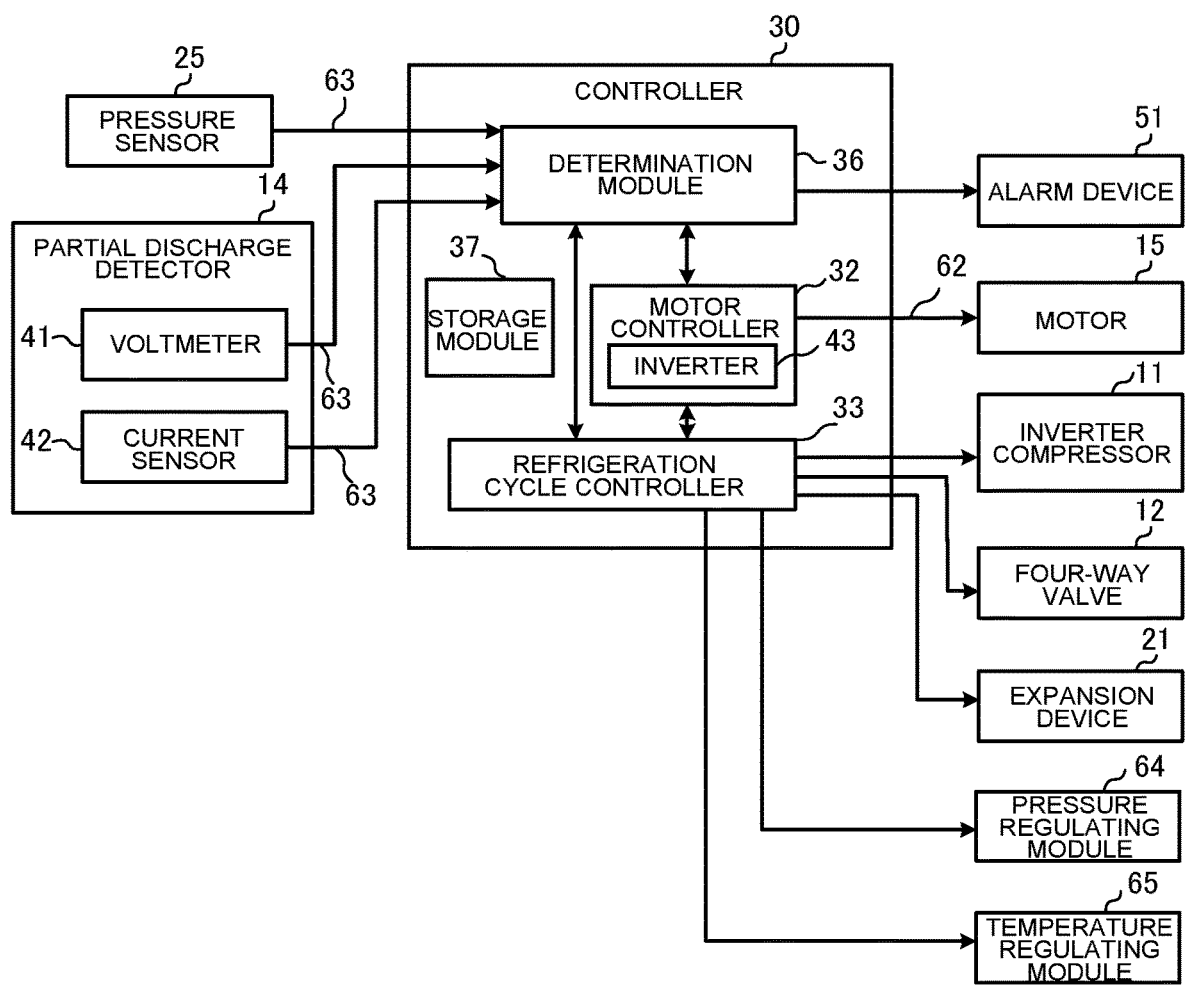
FIG. 3 is a block diagram illustrating an internal configuration of a controller 30 as illustrated in FIGS. 1 and 2.

FIG. 2 is a schematic perspective view illustrating a configuration example of the inside of the heat-source-side unit 10 as illustrated in FIG. 1. An up-down direction in FIG. 2 is, for example, a vertical direction. In Embodiment 1, as illustrated in FIG. 2, the inverter compressor 11 is provided in a housing 16 of the heat-source-side unit 10. The inverter compressor 11 is provided in a lower part of the housing 16. Furthermore, the controller 30 is provided in an upper part of the housing 16. It should be noted that the locations of the inverter compressor 11 and the controller 30 are not limited to the above locations thereof.

As illustrated in FIG. 2, the controller 30 is provided with the motor controller 32 and the refrigeration cycle controller 33, which are located as illustrated in FIG. 1. Although it is not illustrated in FIG. 1, the controller 30 is further provided with the determination module 36. The determination module 36 determines, based on the result of detection by the partial discharge detector 14, whether or not there is a risk of occurrence of a partial discharge that occurs in the motor 15 or whether or not the partial discharge occurs. The partial discharge detector 14 detects at least one of the voltage and current of the motor 15 to detect a partial discharge that occurs in the motor 15.

Furthermore, although it is not illustrated in FIG. 1, the motor controller 32 includes the inverter 43 as illustrated in FIG. 2. The inverter 43 drives the motor 15. The inverter 43 is connected to the motor 15 by a power supply line 62 and supplies electric power to the motor 15. Because of the supply of the electric power, the motor 15 drives the inverter compressor 11. Furthermore, the pressure sensors 25 provided adjacent to the discharge port 11b and suction port 11a of the inverter compressor 11 are connected to the refrigeration cycle controller 33, the motor controller 32, and the determination module 36 of the controller 30 by signal lines 63. The pressure sensor 25 provided adjacent to the discharge port 11b of the inverter compressor 11 detects the discharge pressure of the inverter compressor 11. The pressure sensor 25 provided adjacent to the suction port 11a of the inverter compressor 11 detects the suction pressure of the inverter compressor 11. Furthermore, the pressure sensor 25 may detect the pressure of a space in the inverter compressor 11 in which the motor 15 is provided.

The motor 15 has "partial-discharge-free insulation structure" as described above. That is, the insulation structure of the motor 15 is reinforced by adding insulating paper or using an insulating varnish or mold. As a result, the partial discharge inception voltage is higher than a surge voltage. Thus, by virtue of the above structure of the motor 15, at an early stage, a partial discharge does not occur.

However, once the motor 15 deteriorates in insulation due to aged deterioration, the motor 15 is highly likely to cause a partial discharge. Therefore, in Embodiment 1, the determination module 36 determines, based on the result of detection by the partial discharge detector 14, whether or not there is a risk of occurrence of a partial discharge in the motor 15 or whether or not the partial discharge occurs.

The motor 15 includes a stator and a rotor. The stator includes, for example, a stator core formed in the shape of a cylinder and a winding wound around the stator core. The rotor is provided inward of the stator such that the rotor is rotatable. The rotor includes, for example, a rotor core and permanent magnets spaced from each other in a circumferential direction of the rotor core. It should be noted that the configuration of the motor 15 is not limited to the above configuration.

In Embodiment 1, the determination module 36 uses the voltmeter 41 and the current sensor 42, which are incorporated in the motor controller 32, as the partial discharge detector 14. However, as described above, the voltmeter 41 and the current sensor 42 may be provided outside the motor controller 32. In that case, the voltmeter 41 and the current sensor 42 may be provided, for example, in the inverter compressor 11. The voltmeter 41 and the current sensor 42 are connected to the determination module 36 by a signal line 63.

The inverter 43 provided in the motor controller 32 controls the voltage, current, and rotation speed of the motor 15 of the inverter compressor 11 in response to an instruction from the determination module 36 of the controller 30. The current sensor 42 detects an operating current that is made to flow through the motor 15. The current sensor 42 may detect, as the operating current, the value of a current that is input to the motor 15, or the current sensor 42 may detect the value of an operating current that is fed back to the inverter 43. Furthermore, the current sensor 42 may detect the waveform of the operating current as the operating current. The waveform includes information on the current value and frequency of the operating current. The current sensor 42 outputs the result of detection to the controller 30 via the signal line 63. The voltmeter 41 is a voltage sensor that detects the value of a voltage that is applied from the inverter 43 to the motor 15 or the waveform of the voltage. The waveform includes information on the voltage value and frequency of the voltage value of the applied voltage. The voltmeter 41 outputs the result of detection to the controller 30 via the signal line 63. The controller 30 wirelessly communicates with the alarm device 51 or communicates with the alarm device 51 via a wire.

FIG. 3 is a block diagram illustrating an internal configuration of the controller 30 as illustrated in FIGS. 1 and 2. As described above, the controller 30 is provided with the motor controller 32, the refrigeration cycle controller 33, and the determination module 36. Of the components as illustrated in FIG. 3, the partial discharge detector 14, the determination module 36, and the alarm device 51 are included in the device management system for the inverter compressor 11 according to Embodiment 1. Furthermore, of the components as illustrated in FIG. 3, a pressure regulating module 64 and a temperature regulating module 65 are further included in the device management system for the inverter compressor 11 according to Embodiment 1, as occasion arises.

The configuration as illustrated in FIG. 3 will be described.

The determination module 36 receives results of detection by the voltmeter 41 and the current sensor 42 via the signal lines 63. Based on these results of detection, the determination module 36 determines whether or not there is a risk of occurrence of a partial discharge or whether or not the partial discharge occurs. When determining whether there is a risk of occurrence of a partial discharge or whether the partial discharge occurs, the determination module 36 gives an instruction to the motor controller 32 or the refrigeration cycle controller 33 to cause a first protective operation for reducing the risk of occurrence of the partial discharge or the occurrence of the partial discharge to be performed. Furthermore, when determining that the partial discharge occurs, the determination module 36 gives an instruction to the motor controller 32 or the refrigeration cycle controller 33 to cause a second protective operation for reducing occurrence of the partial discharge to be performed. Furthermore, when even the execution of the first protective operation or the second protective operation does not obtain an effect, the determination module 36 causes a third protective operation for reducing the rate of deterioration of the winding of the motor 15 to be performed. The first to third protective operations will be described later. Furthermore, when determining that there is a risk of occurrence of a partial discharge or the partial discharge occurs, the determination module 36 produces an alarm for the user, using the alarm device 51.

In the first to third protective operations, the motor controller 32 performs a control of operation of the inverter 43 or the motor 15 in response to an instruction from the determination module 36.

In the first to third protective operations, the refrigeration cycle controller 33 performs control of operation of the pressure regulating module 64 or the temperature regulating module 65 in response to an instruction from the determination module 36. The pressure regulating module 64 regulates the pressure in the space in which the motor 15 is provided, in response to an instruction from the refrigeration cycle controller 33. The pressure regulating module 64 is, for example, a pressure pump, a pressure regulator, a pressure-regulating valve, or a check valve. For example, as illustrated in FIG. 2, the pressure regulating module 64 is provided at a side surface or upper surface of the housing 16 of the heat-source-side unit 10 and regulates the pressure in the housing 16. The temperature regulating module 65 regulates the temperature of the space in which the motor 15 is provided, in response to an instruction from the refrigeration cycle controller 33. It suffices that as the temperature regulating module 65, for example, a heat exchanger in the refrigerant circuit is used. In addition, a small-sized cooler such as a Peltier element, a cooling fan, or a water-cooling jacket may be used or added. Alternatively, the temperature regulating module 65 may be a ventilation fan. For example, as illustrated in FIG. 2, the temperature regulating module 65 is provided in the housing 16 of the heat-source-side unit 10 and regulates temperature in the housing 16. It should be noted that preferably, the housing 16 should be sealed in order that the pressure and temperature can be easily regulated.

As illustrated in FIG. 3, the controller 30 further includes a storage module 37. The storage module 37 stores various kinds of data and programs for use in processing by the controller 30. Furthermore, the storage module 37 stores the result of the processing by the controller 30.

A hardware configuration of the controller 30 will be described. Functions of the determination module 36, the motor controller 32, and the refrigeration cycle controller 33 in the controller 30 are fulfilled by a processing circuit. The processing circuit is dedicated hardware or a processor. The dedicated hardware is, for example, an application specific integrated circuit (ASIC) or a field programmable gate array (FPGA). The processor executes a program stored in a memory. The storage module 37 of the controller 30 is the memory. The memory is a nonvolatile or volatile semiconductor memory such as a random access memory (RAM), a read-only memory (ROM), a flash memory, or an erasable programmable ROM (EPROM) or a disk such as a magnetic disk, a flexible disk, or an optical disk.

Figure 4:
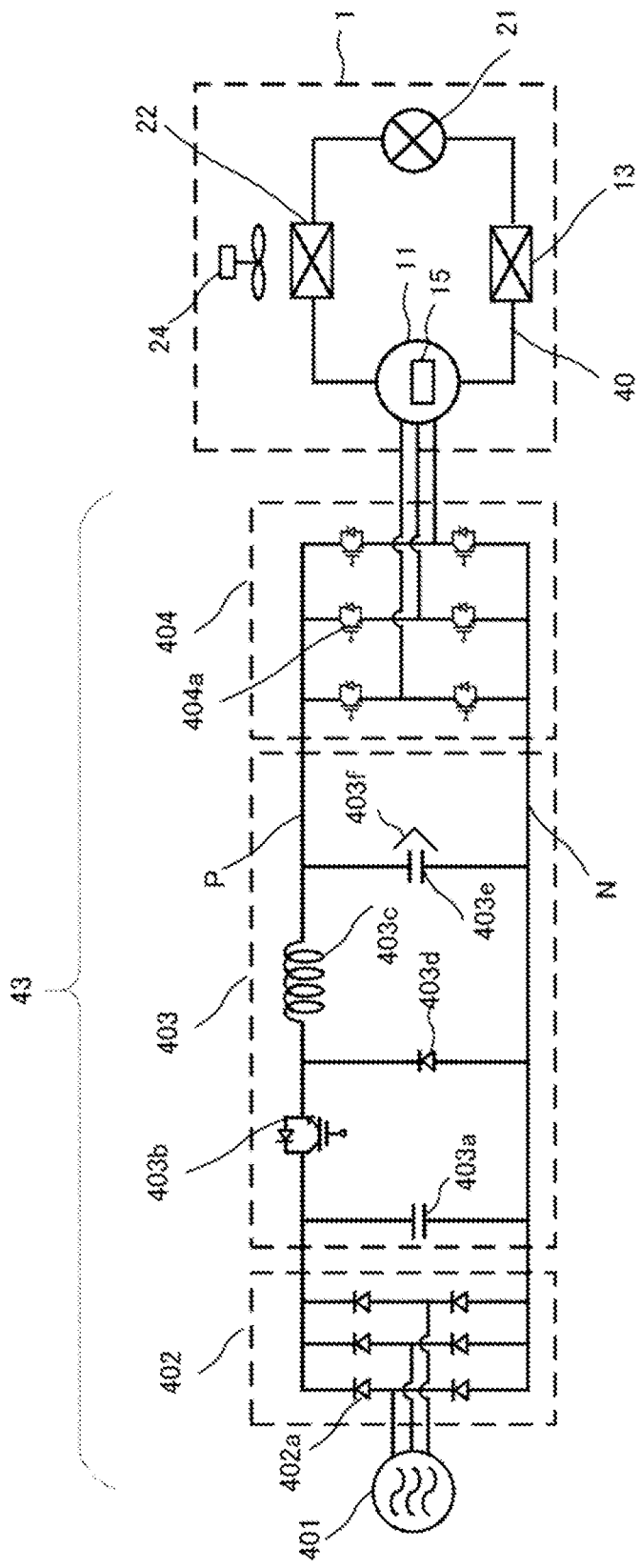
FIG. 4 illustrates a configuration example of an inverter 43 as illustrated in FIG. 2.

FIG. 4 illustrates a configuration example of the inverter 43 as illustrated in FIG. 2. However, the configuration of the inverter 43 as illustrated in FIG. 4 is a mere example and this illustration is not limiting. As illustrated in FIG. 4, the inverter 43 includes a three-phase rectifier 402, a step-down circuit 403, and an inverter circuit 404. It should be noted that only the inverter circuit 404 as illustrated in FIG. 4 may be referred to as "inverter 43", and the three-phase rectifier 402 and the step-down circuit 403 may be each referred to, for example, as "power converter".

The three-phase rectifier 402 is electrically connected to a three-phase AC power supply 401 and supplied with electric power from the three-phase AC power supply 401. The three-phase AC power supply 401 is, for example, a commercial power supply. The three-phase rectifier 402 rectifies an AC voltage of the three-phase AC power supply 401 and coverts it into a DC voltage. In the example as illustrated in FIG. 4, the three-phase rectifier 402 is a three-phase full-wave rectifier in which six rectifier diode elements 402a are bridge-connected. Although the rectifier diode elements 402a are examples of switching elements provided in the three-phase rectifier 402, other power devices may be used. Furthermore, referring to FIG. 4, P and N represent positive and negative buses of DC output from the three-phase rectifier 402, respectively.

The step-down circuit 403 is a circuit that reduces a DC voltage supplied from the three-phase rectifier 402 to an arbitrary DC voltage. The step-down circuit 403 is subjected to feedback control such that a bus voltage Vdc reaches a target voltage value. The step-down circuit 403 includes a main electrolytic capacitor 403a, a step-down switching element 403b, a reactor 403c, a backflow prevention element 403d, a smoothing capacitor 403e, and a voltage detection device 403f.

The step-down switching element 403b has an on state and an off state, and is turned on and off at respective times that are set based on the value of a voltage that is reduced. The reactor 403c serves to supply electric power to the load side. The backflow prevention element 403d is provided to allow a current to continuously flow therethrough. The step-down switching element 403b is a semiconductor element such as a silicon (Si) element. More specifically, the step-down switching element 55 is a semiconductor element such as a metal-oxide semiconductor field-effect transistor (MOSFET) or an insulated gate bipolar transistor (IGBT). Furthermore, the backflow prevention element 403d is a semiconductor element such as a silicon element. Alternatively, the backflow prevention element 403d may be a semiconductor element such as a fast recovery diode.

The main electrolytic capacitor 403a is connected to an output portion of the three-phase rectifier 402, and reduces a ripple current during switching of the step-down switching element 403b. Furthermore, the main electrolytic capacitor 403a acts to reduce a surge voltage that is generated when the step-down switching element 403b is turned off. The main electrolytic capacitor 403a acts to prevent an excessive surge voltage from being applied to components, even in the case where the step-down switching element 403b is turned off while a current is flowing. Accordingly, the inverter 43 can continue its normal operation. It should be noted that the three-phase AC power supply 401 includes a power impedance, and an inductance component of the power impedance may cause generation of a surge voltage.

The smoothing capacitor 403e smooths a pulsed voltage that is subjected to switching by the step-down switching element 403b and the backflow prevention element 403d. That is, the smoothing capacitor 403e is provided to smooth a DC voltage.

The voltage detection device 403f is a voltage sensor that detects, as the bus voltage Vdc, a potential difference between the P and N sides of the smoothing capacitor 403e. That is, the bus voltage Vdc is a voltage between both ends that is stored in the smoothing capacitor 403e.

It should be noted that it is not indispensable that the step-down circuit 403 includes all the components as illustrated in FIG. 4; that is, the step-down circuit 403 may include, for example, only the reactor 403c, the smoothing capacitor 403e, and the voltage detection device 403f.

The inverter circuit 404 converts, into three-phase AC electric power, DC electric power smoothed by the smoothing capacitor 403e. The inverter circuit 404 includes a plurality of switching elements 404a that are semiconductor elements such as IGBTs. In the example as illustrated in FIG. 4, the inverter circuit 404 includes six switching elements 404a that are bridge-connected. That is, because of the operation of the six switching elements 404a, the inverter circuit 404 converts the bus voltage Vdc into a three-phase AC voltage and supplies an AC current to the motor 15 of the inverter compressor 11. The switching elements 404a are, for example, insulated gate bipolar transistors (IGBTs). The switching elements 404a that are IGBTs are examples of switching elements provided in the inverter circuit 404, and other power devices may be used.

Protective operations by the determination module 36 will be described.

First of all, the role of the voltmeter 41 in Embodiment 1 will be described. The voltmeter 41 is attached to the inside or outside of the motor controller 32. Alternatively, the voltmeter 41 may be attached to the inside or outside of the inverter compressor 11. In the case where a surge voltage is generated by a switching operation of the switching elements 404a at the time of driving of the inverter 43, the peak value of a voltage that is detected by the voltmeter 41 is increased.

When the peak value of the voltage exceeds the partial discharge inception voltage, a partial discharge starts to occur in the motor 15. The partial discharge inception voltage is one of characteristic values of the motor 15 that depend on a dielectric strength inherent to the motor 15 and a usage environment.

The determination module 36 sets, based on the partial discharge inception voltage measured in advance through an experiment or other processes, a first threshold as a determination value for use in determination whether or not to perform the first protective operation. The first threshold is stored in advance in the storage module 37. When the value of a voltage detected by the voltmeter 41 exceeds the first threshold, the determination module 36 performs the first protective operation.

It should be noted that although the first threshold may be a value that is equal to the partial discharge inception voltage, it is not indispensable that the first threshold is equal to the partial discharge inception voltage. That is, in order to further reduce the risk of occurrence of the partial discharge, a margin may be given to the first threshold, that is, the first threshold may be set lower than the partial discharge inception voltage.

Furthermore, the first threshold does not need to be a fixed value. The first threshold may be variable, as the partial discharge inception voltage varies depending on the operation state of the motor 15 (for example, the pressure in a space in the inverter compressor 11 in which the motor 15 is provided, the pressure being measured by a pressure sensor 25). In that case, for example, a correlation between the operation state of the motor 15 and the partial discharge inception voltage is measured in advance, and a data table defining a first threshold determined based on the correlation is stored in advance in the storage module 37. It will be described in further detail. In order to simplify the following description, the description is made by referring to by way of example, as the operation state of the motor 15, the pressure of the inverter compressor 11 that is measured by the pressure sensor 25. First, a correlation between the pressure of the inverter compressor 11 measured by the pressure sensor 25 and the partial discharge inception voltage is measured in advance by conducting experiments or other processes. Then, based on the result of the measurement, first thresholds are set for respective pressures measured as described above and stored as a data table in advance in the storage module 37. Based on the pressure of the inverter compressor 11 that is measured by the pressure sensor 25, the determination module 36 extracts an associated first threshold from the data table. Thus, in the case where the first threshold is variable, the first threshold may be determined from an operation state of the motor 15 being in operation that is detected by the pressure sensor 25 provided in the refrigerant circuit 40. In this case, as the pressure of the inverter compressor 11 that is to be stored in the data table, the result of detection by any one of the plurality of pressure sensors 25 may be used, or the average of the results of detection by two or more pressure sensors 25 or other values may be used.

Next, the first protective operation, which is performed under the control of the determination module 36 when a voltage value detected by the voltmeter 41 exceeds the first threshold, will be described. The first protective operation is an operation to reduce the occurrence of the partial discharge. As the first protective operation, the following processes (a) to (c) are present, and it suffices that any one or more of those processes are performed. In the case of selecting one or more of the processes (a) to (c), it suffices that one or more of these processes are selected as processes to be executed, as appropriate, by the determination module 36 or a user setting on the basis of the characteristics and usage environment of the motor 15.

(a) The determination module 36 gives an instruction to the motor controller 32 to reduce the bus voltage Vdc of the inverter 43 until a surge voltage detected by the voltmeter 41 becomes lower than or equal to the first threshold, to thereby reduce the surge voltage. The determination module 36 instructs the motor controller 32 to maintain a bus voltage Vdc obtained at a point in time at which the surge voltage detected by the voltmeter 41 becomes lower than or equal to the first threshold, and causes the inverter compressor 11 continue operating.

(b) The determination module 36 gives an instruction to the motor controller 32 to reduce the frequency of a voltage that is applied to the motor 15 of the inverter compressor 11, until the surge voltage detected by the voltmeter 41 becomes lower than or equal to the first threshold, to thereby reduce the surge voltage. The determination module 36 instructs the motor controller 32 to maintain the frequency of a voltage obtained at a point in time at which the surge voltage detected by the voltmeter 41 becomes lower than or equal to the first threshold, and causes the inverter compressor 11 continue operating.

(c) The determination module 36 gives an instruction to the pressure regulating module 64 via the refrigeration cycle controller 33 to raise the pressure in the space in which the motor 15 of the inverter compressor 11 is provided, until the surge voltage detected by the voltmeter 41 becomes lower than or equal to the first threshold. When the pressure is raised, the partial discharge inception voltage is also raised. The determination module 36 instructs the pressure regulating module 64 to maintain a pressure obtained at a point in time at which the surge voltage detected by the voltmeter 41 becomes lower than or equal to the first threshold, and causes the inverter compressor 11 continue operating.

It should be noted that it is hard to set the first threshold in consideration of an aged deterioration level that is determined depending on the usage environment and the frequency of use by the user. It is undesirable that the first threshold is lowered without careful consideration in consideration of the aged deterioration. This is because if the first threshold is lowered without careful consideration, it causes the above processes (a) to (c) to be frequently executed, as a result of which a stable operation cannot be performed; that is, it causes a decrease in function. Therefore, the device management system according to Embodiment 1 further has a function of performing the second protective operation.

Next, the role of the current sensor 42 in Embodiment 1 will be described. As described above, it is hard to set the first threshold in consideration of the aged deterioration level. Therefore, in the case where the level of insulation deterioration of the motor 15 that is caused by aged deterioration exceeds a certain level, there is a possibility that a partial discharge will occur even when a surge voltage detected by the voltmeter 41 is lower than or equal to the first threshold. Therefore, it is necessary to perform the second protective operation, which is necessary in the case where the partial discharge occurs.

In the following, the second protective operation is described. When a partial discharge occurs, a current noise is made in a current value that the current sensor 42 detects. Therefore, in the case where a current noise that is made at the time when a partial discharge occurs at the motor 15 of the inverter compressor 11 is detected by the current sensor 42, the second protective operation is performed under the control of the determination module 36. As the second protective operation, the following processes (d) to (f) are present, and it suffices that any one or more of those processes are performed. In the case of selecting one or more of the processes (d) to (f), it suffices that one or more of these processes are selected as processes to be executed, as appropriate, by the determination module 36 or a user setting, on the basis of the individual characteristics and usage environment of the motor 15.

(d) The determination module 36 gives an instruction to the motor controller 32 to reduce the bus voltage Vdc of the inverter 43 until no current noise is detected any longer by the current sensor 42, to thereby reduce the surge voltage. The determination module 36 instructs the motor controller 32 to maintain a bus voltage Vdc obtained at a point in time at which no current noise is detected any longer by the current sensor 42, and causes the inverter compressor 11 continue operating.

(e) The determination module 36 gives an instruction to the motor controller 32 to reduce the frequency of a voltage that is applied to the motor 15 until no current noise is detected any longer by the current sensor 42, to thereby reduce the surge voltage. The determination module 36 instructs the motor controller 32 to maintain the frequency of a voltage obtained at a point in time at which no current noise is detected any longer by the current sensor 42, and causes the inverter compressor 11 continue operating.

(f) The determination module 36 gives an instruction to the pressure regulating module 64 via the refrigeration cycle controller 33 to raise the pressure in the space in which the motor 15 of the inverter compressor 11 is provided, until no current noise is detected any longer by the current sensor 42. When the pressure rises, the partial discharge inception voltage also rises. The determination module 36 instructs the pressure regulating module 64 to maintain a pressure obtained at a point in time at which no current noise is detected any longer by the current sensor 42, and causes the inverter compressor 11 continue operating.

Because of performance of the second protective operation, it is possible to continue operation while reducing the occurrence of the partial discharge.

In the case where a minimum function required by the user is not fulfilled after execution of the first protective operation and the second protective operation, the device management system performs the third protective operation. As the third protective operation, the following processes (g) and (h) are present. It suffices that any one or more of the processes (g) and (h) are performed as the third protective operation. In the case of selecting one or more of the processes (g) and (h), it suffices that one or more of these processes are selected as processes to be executed, as appropriate, by the determination module 36 or a user setting, on the basis of the characteristics and usage environment of the motor 15.

(g) The determination module 36 gives an instruction to the temperature regulating module 65 via the refrigeration cycle controller 33 to lower, to a preset temperature, the temperature of the space in which the motor 15 of the inverter compressor 11 is provided. As a result, the rise in the winding temperature of the motor 15 during operation is reduced, thereby lowering the rate of deterioration of the winding of the motor 15 which is caused by the partial discharge. Alternatively, the determination module 36 may issue an instruction to the temperature regulating module 65 to lower the temperature of the space in which the motor 15 of the inverter compressor 11 is provided, until a voltage detected by the voltmeter 41 becomes lower than or equal to the first threshold. Then, the determination module 36 instructs the temperature regulating module 65 to maintain the preset temperature or maintain the temperature at a point in time at which a voltage detected by the voltmeter 41 becomes lower than or equal to the first threshold, and maintains the temperature of the space in which the motor 15 is provided.

(h) The determination module 36 gives an instruction to the motor controller 32 to reduce to a preset value, an operating current that is made to flow through the motor 15 of the inverter compressor 11. As a result, the amount of heat that is generated by the winding of the motor 15 is reduced, and the rate of deterioration of the winding of the motor 15 that is caused by the partial discharge is lowered. Alternatively, the determination module 36 may send an instruction to the motor controller 32 to reduce the operating current that is made to flow through the motor 15 of the inverter compressor 11, until a voltage detected by the voltmeter 41 becomes lower than or equal to the first threshold. Then, the determination module 36 instructs the motor controller 32 to maintain the preset value or maintain the operating current of the motor 15 at a point in time at which a voltage detected by the voltmeter 41 becomes lower than or equal to the first threshold, and causes the inverter compressor 11 to continue operating.

It should be noted that the following control may be performed as the third protective operation in addition to the foregoing processes (g) and (h). That is, the determination module 36 gives an instruction to the motor controller 32 to raise the rotation speed of the motor or the inverter compressor 11 to a preset value or until a voltage detected by the voltmeter 41 becomes lower than or equal to the first threshold. This raises the partial discharge inception voltage by raising the effect of cooling the motor 15 through an increase in circulating volume of refrigerant and lowering the winding temperature of the motor 15. In this case, the determination module 36 instructs the motor controller 32 to maintain the preset value or maintain the rotation speed of the motor 15 at a point in time at which a voltage detected by the voltmeter 41 becomes lower than or equal to the first threshold, and causes the inverter compressor 11 to continue operating.

Next, in the case where at least one of the first to third protective operations is performed, the alarm device 51 issues an alarm under the control by the determination module 36. For example, as the alarm, a message "It is expected that a failure will occur" is displayed on a screen of the alarm device 51. The user notifies a maintenance agency that the alarm device 51 has issued the alarm. When receiving from the user, a notification to the effect that the refrigeration cycle system 1 has issued the alarm, a worker of the maintenance agency prepares a replacement inverter compressor 11 and arranges with the user about a plan of replacing the inverter compressor 11 by a replacement one. In such a manner, the user of the refrigeration cycle system 1 can replace the inverter compressor 11 by a replacement one, by design. As a result, the user can shorten a time period in which the inverter compressor 11 is in a stopped state due to its failure, and the maintenance agency can reduce the number of inverter compressors 11 carried in stock. Furthermore, in general, if a failure occurs in the motor 15, in the worst case, the motor 15 may burn and foreign matter generated by destruction of the motor 15 may be let out from the inverter compressor 11. In that case, the foreign matter damages a unit circuit of the heat-source-side unit 10. However, in Embodiment 1, because the partial discharge detector 14 and the determination module 36 are provided, it is possible to avoid generation of such foreign matter as described above and damage of the unit circuit, and thus cut repair costs.

Furthermore, although it is described above that the replacement of the inverter compressor 11 by a replacement one is a measure to be taken after an alarm is issued, it is not limiting. This measure is taken on the assumption that the motor 15 is operated for a long time period and thus deteriorates in insulation, thereby lowering the partial discharge inception voltage and causing a partial discharge. By contrast, in the case where an alarm is issued at a comparatively early stage, a power-supply environment provided by the user or a method of use by the user is highly likely to be beyond the scope of the assumption. Thus, even if the inverter compressor 11 is replaced by an inverter compressor 11 having the same specifications as the former one, it is not sufficient. In that case, it is necessary to replace the inverter compressor 11 by another compressor provided with a motor 15 having a further reinforced insulation structure and a higher partial discharge inception voltage. Alternatively, as a more common, simpler, and lower-cost measure, the length of the power supply line 62 connecting the motor controller 32 to the inverter compressor 11 may be decreased, or the outer diameter of the power supply line 62 may be increased. Alternatively, a filter for reduction of a surge voltage, such as an AC reactor, may be added to the motor controller 32. However, needless to say, it is important to add the filter in consideration of the effect of a voltage drop on operating characteristics.

Figure 5:
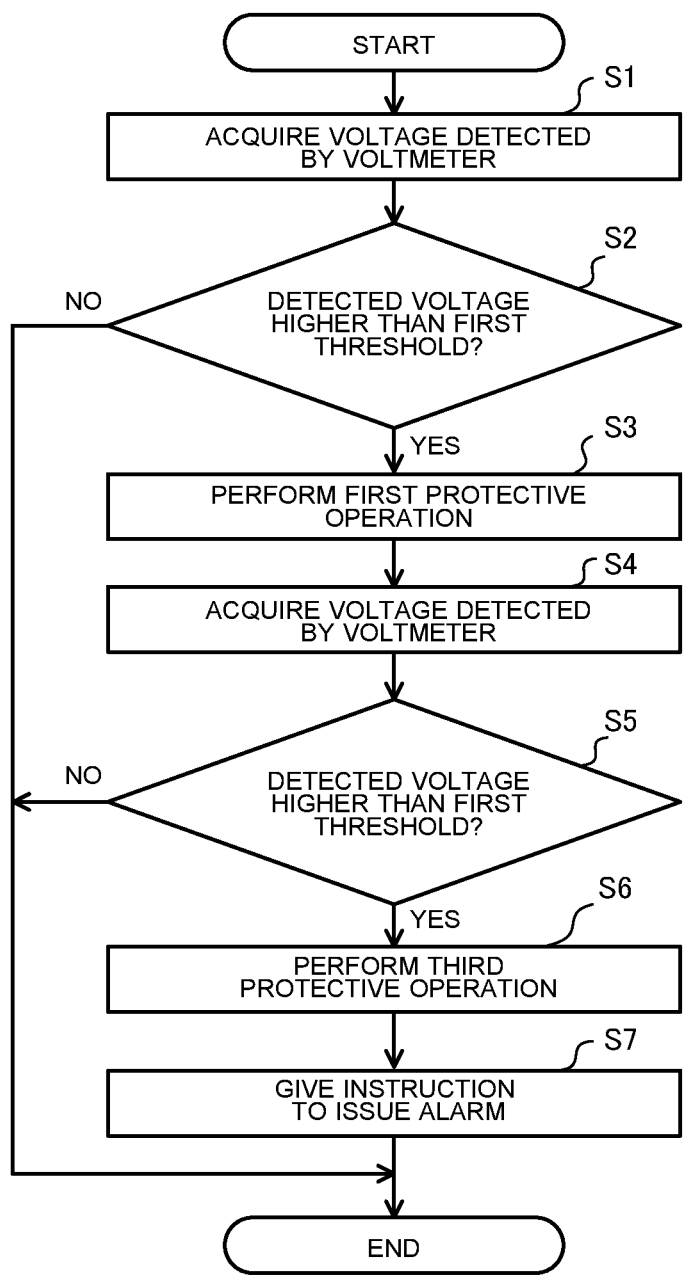
FIG. 5 is a flow chart indicating the flow of processes of the device management system for the inverter compressor 11 according to Embodiment 1.
Figure 6:
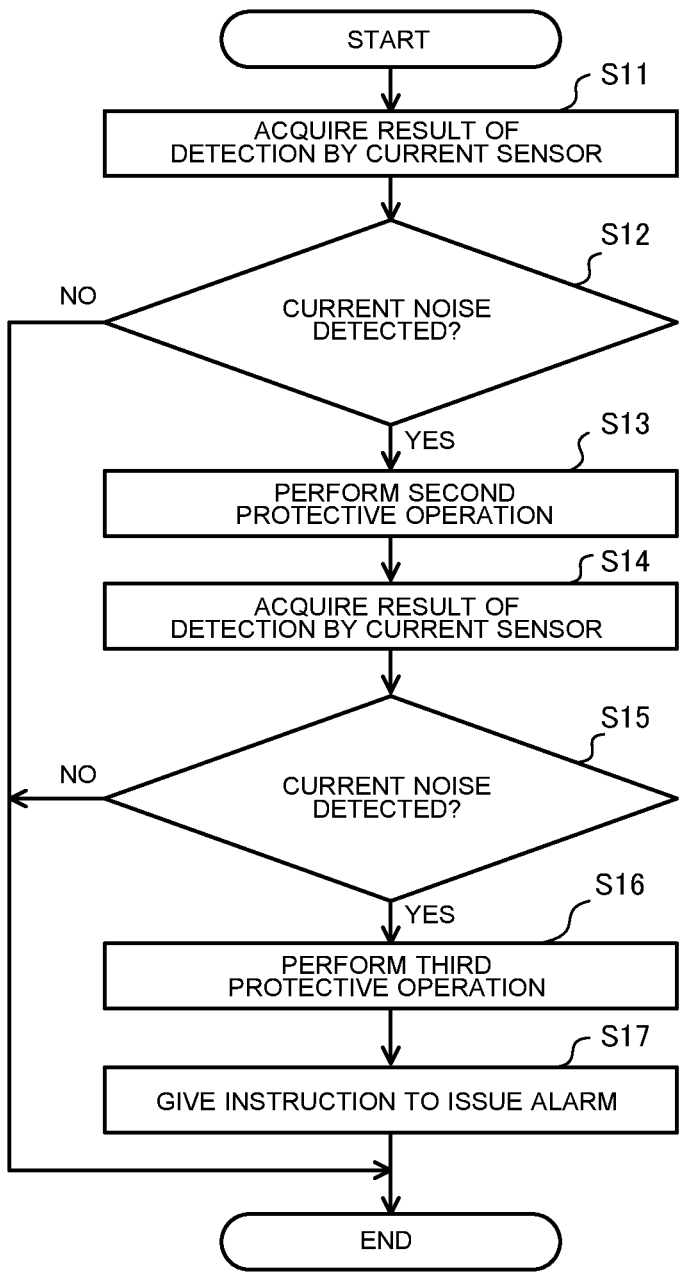
FIG. 6 is a flow chart indicating the flow of further processes of the device management system for the inverter compressor 11 according to Embodiment 1.
Figure 7:
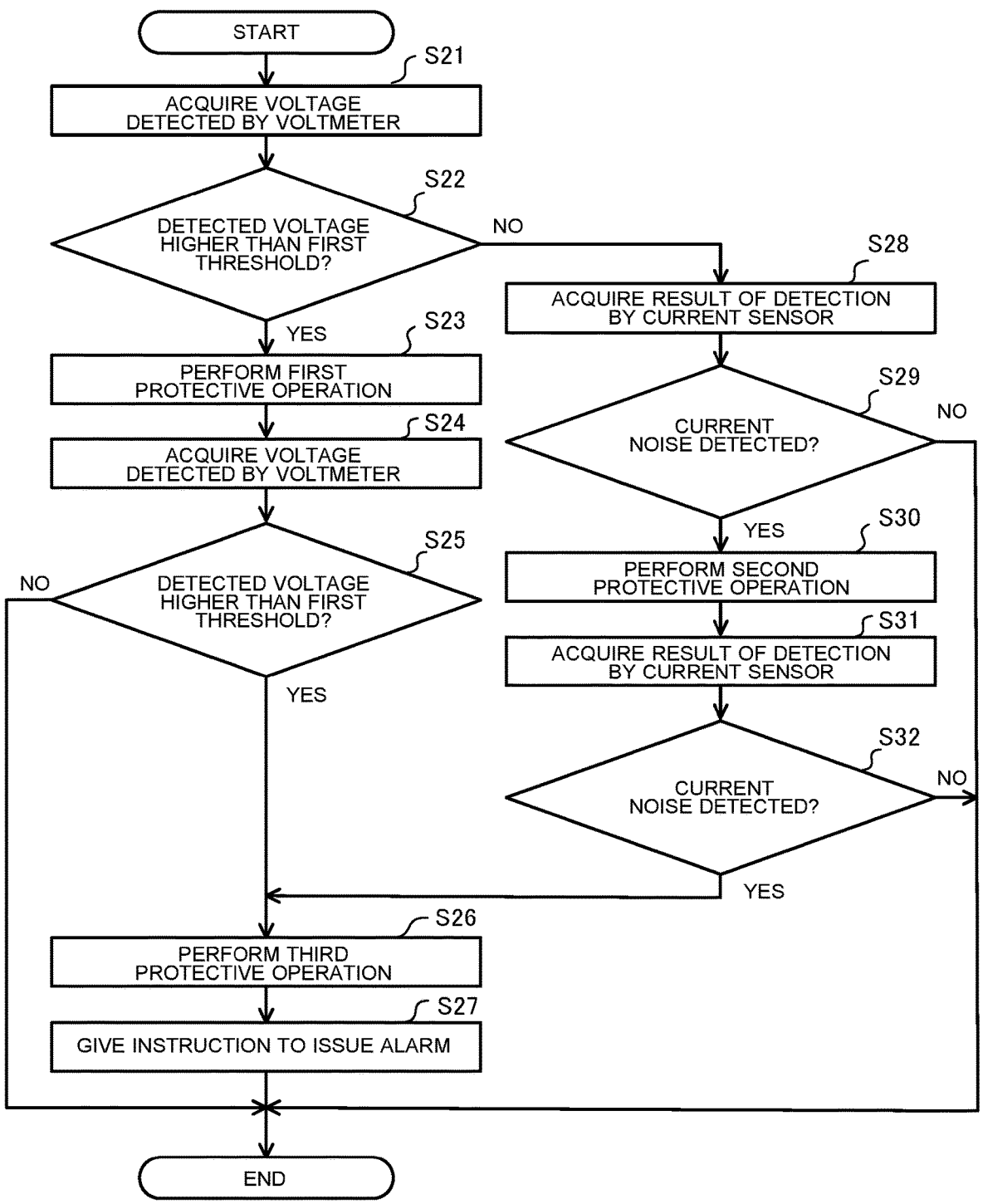
FIG. 7 is a flow chart indicating the flow of still further processes of the device management system for the inverter compressor 11 according to Embodiment 1.

FIGS. 5 to 7 are each a flow chart indicating the flow of processes of the device management system for the inverter compressor 11 according to Embodiment 1. Although it is described above that the determination module 36 uses both the result of detection by the voltmeter 41 and that of detection by the current sensor 42, it is not limiting. As illustrated in FIGS. 5 to 7, the determination module 36 may use at least one of the result of detection by the voltmeter 41 and that of detection by the current sensor 42.

First of all, FIG. 5 will be referred to. In the flow indicated in FIG. 5, the determination module 36 uses only the result of detection by the voltmeter 41.

As indicated in FIG. 5, in step S1, the determination module 36 acquires a voltage detected by the voltmeter 41.

Next, in step S2, the determination module 36 determines whether the voltage acquired in step S1 is higher than the first threshold. When the determination module 36 determines that the voltage is higher than the first threshold, the processing by the determination module 36 proceeds to step S3. By contrast, when determining that the voltage is lower than or equal to the first threshold, the determination module 36 ends the flow of FIG. 5.

In step S3, the determination module 36 performs the above first protective operation. Specifically, the determination module 36 performs at least one of the processes (a) to (c) of the first protective operation.

Next, in step S4, after a first preset time period elapses, the determination module 36 re-acquires a voltage detected by the voltmeter 41.

In step S5, the determination module 36 determines whether the voltage acquired in step S4 is higher than the first threshold or not. When the determination module 36 determines that the voltage is higher than the first threshold, the processing by the determination module 36 proceeds to step S6. By contrast, when determining that the voltage is lower than or equal to the first threshold, the determination module 36 ends the flow of FIG. 5.

In step S6, the determination module 36 performs the above third protective operation. Specifically, the determination module 36 performs at least one of the processes (g) and (h) of the third protective operation.

Next, in step S7, the determination module 36 instructs the alarm device 51 to issue an alarm, for example, the alarm "It is expected that a failure will occur". The alarm device 51 issues the alarm to the user.

Although it is described above that in the example indicated in FIG. 5, in step 7, the determination module 36 instructs the alarm device 51 to issue an alarm, it is not limiting. For example, the determination module 36 may instruct the alarm device 51 to issue an alarm, after step S3 is carried out.

Next, FIG. 6 will be referred to. In the flow as indicated in FIG. 6, the determination module 36 uses only the result of detection by the current sensor 42.

As indicated in FIG. 6, in step S11, the determination module 36 acquires a current detected by the current sensor 42.

Next, in step S12, the determination module 36 determines whether current noise is generated or not, based on the current acquired in step S11. When the determination module 36 determines that current noise is generated, the processing by the determination module 36 proceeds to step S13. By contrast, when determining that current noise is not generated, the determination module 36 ends the flow of FIG. 5.

In step S13, the determination module 36 performs the above second protective operation. Specifically, the determination module 36 performs at least one of the processes (d) to (f) of the second protective operation.

Next, in step S14, after a second preset time period elapses, the determination module 36 re-acquires a current detected by the current sensor 42.

In step S15, the determination module 36 determines whether current noise is generated or not, based on the current acquired in step S14. When the determination module 36 determines that current noise is generated, the processing by the determination module 36 proceeds to step S16. By contrast, when determining that current noise is not generated, the determination module 36 ends the flow of FIG. 5.

In step S16, the determination module 36 performs the above third protective operation. Specifically, the determination module 36 performs at least one of the processes (g) and (h) of the third protective operation.

Next, in step S17, the determination module 36 instructs the alarm device 51 to issue an alarm, for example, the alarm "It is expected that a failure will occur". The alarm device 51 issues the alarm to the user.

Although it is described above that in the example indicated in FIG. 6, in step S16, the determination module 36 instructs the alarm device 51 to issue an alarm, it is not limiting. For example, the determination module 36 may instruct the alarm device 51 to issue an alarm, after step S13 is carried out.

Next, FIG. 7 will be referred to. In the flow indicated in FIG. 7, the determination module 36 uses both the result of detection by the voltmeter 41 and that of detection by the current sensor 42.

As indicated in FIG. 7, in step S21, the determination module 36 acquires a voltage detected by the voltmeter 41.

Next, in step S22, the determination module 36 determines whether the voltage acquired in step S21 is higher than the first threshold or not. When the determination module 36 determines that the voltage is higher than the first threshold, the processing by the determination module 36 proceeds to step S23. By contrast, when the determination module 36 determines that the voltage is lower than or equal to the first threshold, the processing by the determination module 36 proceeds to step S28.

In step S23, the determination module 36 performs the above first protective operation. Specifically, the determination module 36 performs at least one of the processes (a) to (c) of the first protective operation.

Next, in step S24, after the first preset time period elapses, the determination module 36 re-acquires a voltage detected by the voltmeter 41.

In step S25, the determination module 36 determines whether the voltage acquired in step S24 is higher than the first threshold or not. When the determination module 36 determines that the voltage is higher than the first threshold, the processing by the determination module 36 proceeds to step S26. By contrast, when the determination module 36 determines that the voltage is lower than or equal to the first threshold, the determination module 36 ends the flow of FIG. 7.

In step S26, the determination module 36 performs the above third protective operation. Specifically, the determination module 36 performs at least one of the processes (g) and (h) of the third protective operation.

Next, in step S27, the determination module 36 instructs the alarm device 51 to issue an alarm, for example, the alarm "It is expected that a failure will occur". The alarm device 51 issues the alarm to the user.

In step S28, the determination module 36 acquires a current detected by the current sensor 42.

Next, in step S29, the determination module 36 determines whether current noise is generated or not, based on the current acquired in step S28. When the determination module 36 determines that current noise is generated, the processing by the determination module 36 proceeds to step S30. By contrast, when the determination module 36 determines that current noise is not generated, the determination module 36 ends the flow of FIG. 7.

In step S30, the determination module 36 performs the above second protective operation. Specifically, the determination module 36 performs at least one of the processes (d) to (f) of the second protective operation.

Next, in step S31, after the second preset time period elapses, the determination module 36 re-acquires a current detected by the current sensor 42.

In step S32, the determination module 36 determines whether current noise is generated or not, based on the current acquired in step S31. When the determination module 36 determines that current noise is generated, the processing by the determination module 36 proceeds to the above step S26. By contrast, when the determination module 36 determines that current noise is not generated, the determination module 36 ends the flow of FIG. 7.

Although it is described above that in the example indicated in FIG. 7, in step S27, the determination module 36 instructs the alarm device 51 to issue an alarm, it is not limiting. For example, the determination module 36 may instruct the alarm device 51 to issue an alarm, after step S23 and after step S30.

Furthermore, although it is described above that in the flows of FIGS. 5 to 7, in steps S6, S16, and S26, the third protective operation is performed, it is not limiting. That is, in the flows of FIGS. 5 to 7, the processes of steps S6, S16, and S26 may be omitted.

Furthermore, the first preset time period in step S4 and step S24 and the second preset time period in step S14 and step S31 may be equal to or different from each other.

As described above, the device management system according to Embodiment 1 includes the partial discharge detector 14 which detects at least one of the voltage and current of a motor 15 to detect a risk of occurrence of a partial discharge in the motor 15 or occurrence of the partial discharge. Furthermore, the device management system according to Embodiment 1 includes the determination module 36 which determines whether or not there is a risk of occurrence of a partial discharge or whether a partial discharge occurs or not, based on the result of detection by the partial discharge detector 14. Because of the presence of the determination module 36, it is possible to detect a risk of occurrence of a partial discharge or occurrence of the partial discharge.

Furthermore, the device management system according to Embodiment 1 further includes the alarm device 51 which issues an alarm in the case where the determination module 36 determines that there is a risk of occurrence of a partial discharge or the partial discharge occurs. When being given the alarm from the alarm device 51, the user contacts the maintenance agency. Therefore, the user can replace the inverter compressor 11 by a replacement one by design. Accordingly, it is possible to replace the inverter compressor 11 by the replacement one before a fatal failure occurs.

Furthermore, in the device management system according to Embodiment 1, the determination module 36 performs the first protective operation or the second protective operation, when determining that there is a risk of occurrence of a partial discharge or the partial discharge occurs. Thus, it is possible to cause the inverter compressor 11 to continuously operate, while preventing the occurrence of the partial discharge and maintaining a state in which the partial discharge does not occur. Accordingly, it is possible to prevent insulation breakdown or burnout of the motor 15 and avoid the spread of damage, such as damage to the unit circuit of the heat-source-side unit 10.

Furthermore, in the device management system according to Embodiment 1, when determining that it is not possible to obtain a sufficient effect even by performing the first protective operation or the second protective operation, the determination module 36 performs the third protective operation to reduce the rate of deterioration of the winding of the motor 15. Accordingly, it is possible to reduce the rate of deterioration of the winding of the motor 15.

The inverter compressor 11 to which the present disclosure is applied employs R410A or R404A, which is a hydrofluorocarbon (HFC) mixed refrigerant, as operating refrigerant. However, since R410A and R404A has high global warming potential (GWP), R410A and R404A are in the process of being substituted by refrigerants that are lower in GWP than R410A and R404A. As a promising example of refrigerants that have low GWP, HFC32 (difluoromethane ($CH_2F_2$), R32) is present. HFC32 is already actually used in, for example, compressors that are mounted in domestic air-conditioning apparatuses (room air conditioners). Furthermore, the refrigerant circuit is filled with refrigerating machine oil that is suitable for use in combination with the refrigerant. Accordingly, since the motor 15 mounted in the inverter compressor 11 is used under an unusual environment in which the refrigerant and the refrigerating machine oil are used in combination, the risk of occurrence of the partial discharge is also affected by the volume resistivity of the refrigerant and the refrigerating machine oil. For example, in the case where HFC32, which has lower volume resistivity than R410A, is used as the refrigerant, there is a higher risk of occurrence of the partial discharge. Therefore, in the case where HFC32 is used as the refrigerant, advantages as described in the present disclosure can be more satisfactorily obtained. Thus, in the refrigeration cycle system 1 according to Embodiment 1, a hydrofluorocarbon (HFC) refrigerant or a mixed refrigerant, such as R410A, R404A, or HFC32, which does not contain chloride in a molecular structure is used as operating refrigerant of the inverter compressor 11. Furthermore, in the case where of those refrigerants, slightly flammable refrigerant, such as HFC32, which has low GWP, is used, it is possible to reduce the effect of global warming and obtain greater advantages in the present disclosure.

Furthermore, the inverter compressor 11 according to Embodiment 1 of the present disclosure employs a low-pressure shell structure or a high-pressure shell structure. The low-pressure shell structure is a structure in which the motor 15 is provided in a space in the inverter compressor 11 that is provided for suction gas refrigerant. The high-pressure shell structure is a structure in which the motor 15 is provided in a space in the inverter compressor 11 that is provided for of discharge gas refrigerant. Therefore, the pressure of atmosphere around the motor 15 in the low-pressure shell structure is lower than that in the high-pressure shell structure. It should be noted that the lower the pressure, the more easily a partial discharge occurs. Therefore, in the case where the low-pressure shell structure is used, a partial discharge more easily occurs than in the case where the high-pressure shell structure is used. Also, it should be noted that the likelihood of occurrence of the partial discharge is affected by not only how low the pressure is, but also how high the temperature is. However, since it is more greatly affected by the pressure than by the temperature, the low-pressure shell structure more easily causes the partial discharge to occur than the high-pressure shell structure, though the temperature of atmosphere around the motor 15 in the high-pressure shell structure is higher than that in the low-pressure shell structure. Accordingly, according to the present disclosure, in the case where the inverter compressor 11 has a low-pressure shell structure, greater advantages can be obtained. Thus, a technique as described in the present disclosure is effective especially in the case where the inverter compressor 11 has a low-pressure shell structure. In such a manner, in the refrigeration cycle system 1 according to Embodiment 1, the inverter compressor 11 has the low-pressure shell structure or the high-pressure shell structure, and in particular, in the case where the inverter compressor 11 has the low-pressure shell structure, greater advantages can be obtained as described in the present disclosure.

Embodiment 2

A device management system for an inverter compressor according to Embodiment 2 will be described. In Embodiment 2, a fourth protective operation is performed instead of the third protective operation, which is described above regarding Embodiment 1. The other configurations and operations are the same as those of Embodiment 1, and their descriptions will thus be omitted.

In Embodiment 2, in the case where a minimum function required by the user is not fulfilled even by performance of the first protective operation, the device management system performs the fourth protective operation. The partial discharge inception voltage has temperature dependence, and is featured in that the partial discharge inception voltage rises as the temperature drops. That is, the higher the temperature, the more easily a discharge occurs, and the lower the temperature, the less likely a discharge is to occur. Therefore, the fourth protective operation is performed in consideration of the above feature. In the fourth protective operation, for example, a control of reducing the temperature of the motor 15 is performed, thereby raising the partial discharge inception voltage.

As the fourth protective operation, the following processes (i) to (k) are present. It suffices that as the fourth protective operation, any one or more of the following processes (i) to (k) are performed. In the case of selecting any one or more of the processes (i) to (k), it suffices that any one or more of the processes (i) to (k) are selected as appropriate by the determination module 36 or a user setting, based on the characteristics and usage environment of the motor 15.

(i) The determination module 36 gives an instruction to the motor controller 32 to decrease an operating current that is made to flow through the motor 15 of the inverter compressor 11, until a surge voltage detected by the voltmeter 41 becomes lower than or equal to the first threshold, to thereby reduce the amount of heat that is generated by the winding of the motor 15. In such a manner, the winding temperature of the motor 15 is reduced, thereby raising the partial discharge inception voltage. Then, the determination module 36 instructs the motor controller 32 to maintain the operating current of the motor 15 at a point in time at which the surge voltage detected by the voltmeter 41 becomes lower than or equal to the first threshold, and causes the inverter compressor 11 to continue operating.

(j) The determination module 36 gives an instruction to the temperature regulating module 65 via the refrigeration cycle controller 33 to lower the temperature of the space in which the motor 15 of the inverter compressor 11 is provided, until the surge voltage detected by the voltmeter 41 becomes lower than or equal to the first threshold. This raises the partial discharge inception voltage. Then, the determination module 36 instructs the temperature regulating module 65 to maintain the temperature at a point in time at which the surge voltage detected by the voltmeter 41 becomes lower than or equal to the first threshold, and causes the inverter compressor 11 to continue operating.

(k) The determination module 36 gives an instruction to the motor controller 32 to raise the rotation speed of the motor or the inverter compressor 11 until the surge voltage detected by the voltmeter 41 becomes lower than or equal to the first threshold. This improves the effect of cooling the motor 15 through an increase in circulating volume of refrigerant and lowers the winding temperature of the motor 15, thereby raising the partial discharge inception voltage. The determination module 36 instructs the motor controller 32 to maintain the rotation speed of the motor 15 at a point in time at which the surge voltage detected by the voltmeter 41 becomes lower than or equal to the first threshold, and causes the inverter compressor 11 to continue operating.

Figure 8:
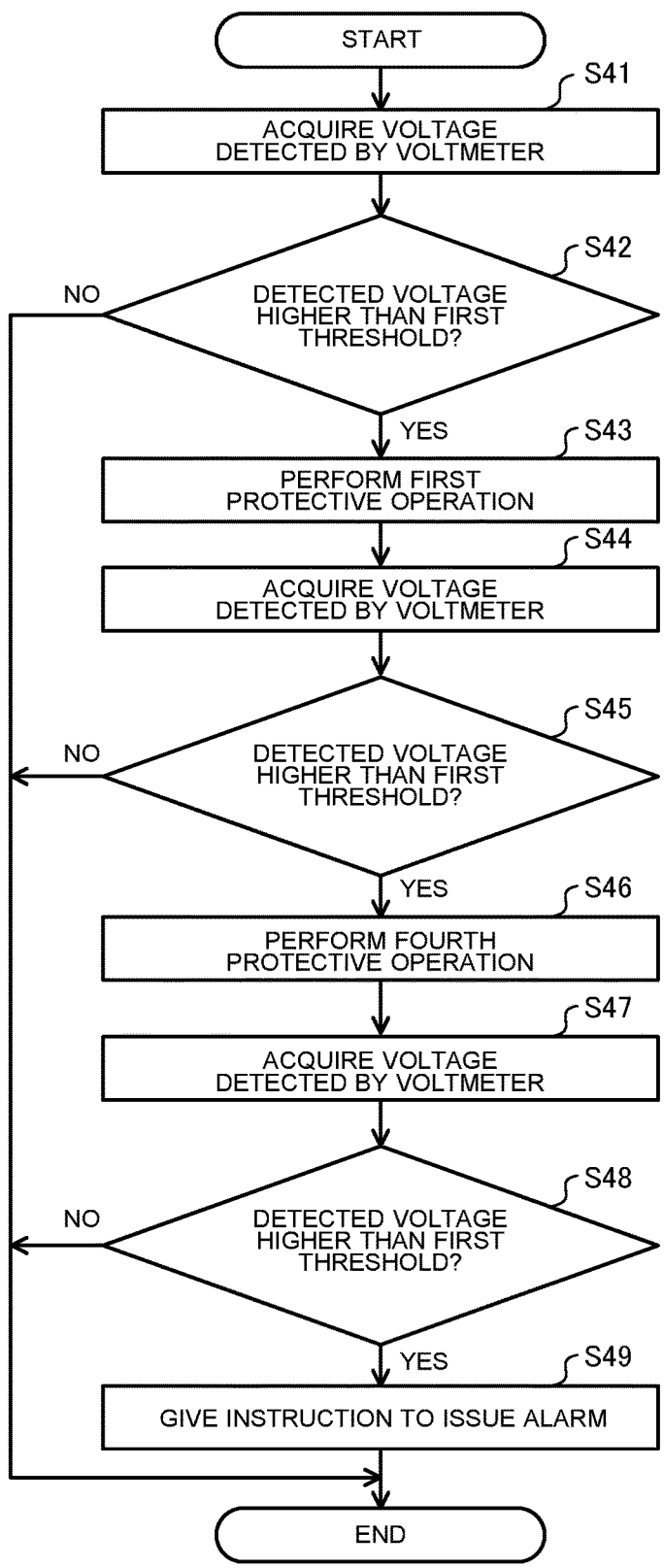
FIG. 8 is a flow chart indicating the flow of processes of a device management system for an inverter compressor 11 according to Embodiment 2.

FIG. 8 is a flow chart indicating the flow of processes of the device management system for the inverter compressor 11 according to Embodiment 2. In the flow indicated in FIG. 8, the determination module 36 uses the result of detection by the voltmeter 41.

As indicated in FIG. 8, in step S41, the determination module 36 acquires a voltage detected by the voltmeter 41.

Next, in step S42, the determination module 36 determines whether the voltage acquired in step S41 is higher than the first threshold or not. When the determination module 36 determines that the voltage is higher than the first threshold, the processing by the determination module 36 proceeds to step S43. By contrast, when determining that the voltage is lower than or equal to the first threshold, the determination module 36 ends the flow of FIG. 8.

In step S43, the determination module 36 performs the above first protective operation. Specifically, the determination module 36 performs at least one of the processes (a) to (c) of the above first protective operation.

Next, in step S44, after the first preset time period elapses, the determination module 36 re-acquires a voltage detected by the voltmeter 41.

In step S45, the determination module 36 determines whether the voltage acquired in step S44 is higher than the first threshold or not. When the determination module 36 determines that the voltage is higher than the first threshold, the processing by the determination module 36 proceeds to step S46. By contrast, when determining that the voltage is lower than or equal to the first threshold, the determination module 36 ends the flow of FIG. 8.

In step S46, the determination module 36 performs the above fourth protective operation. Specifically, the determination module 36 performs at least one of the processes (i) to (k) of the fourth protective operation.

Next, in step S47, after the first preset time period elapses, the determination module 36 re-acquires a voltage detected by the voltmeter 41.

In step S48, the determination module 36 determines whether the voltage acquired in step S47 is higher than the first threshold or not. When the determination module 36 determines that the voltage is higher than the first threshold, the processing by the determination module 36 proceeds to step S49. By contrast, when the determination module 36 determines that the voltage is lower than or equal to the first threshold, the determination module 36 ends the flow of FIG. 8.

In step S49, the determination module 36 instructs the alarm device 51 to issue an alarm, for example, the alarm "It is expected that a failure will occur". The alarm device 51 issues the alarm to the user.

Although it is described above that in the example indicated in FIG. 8, in step S49, the determination module 36 instructs the alarm device 51 to issue an alarm, it is not limiting. For example, the determination module 36 may instruct the alarm device 51 to issue an alarm after step S43 or step S45 is carried out.

As a modification of Embodiment 2, the first protective operation of step S43 and the fourth protective operation of step S46 may be interchanged in the flow chart of FIG. 8.

Figure 9:
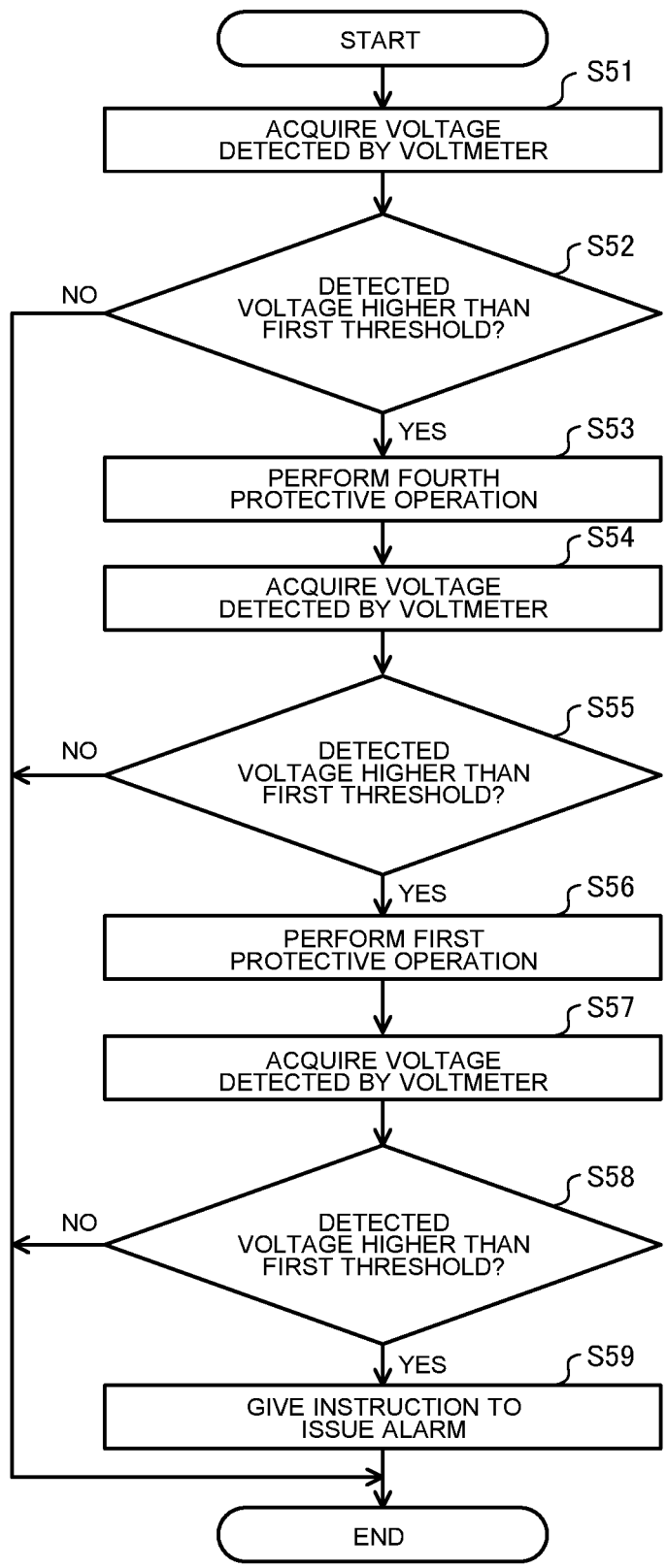
FIG. 9 is a flow chart indicating the flow of processes of a device management system for an inverter compressor 11 according to a modification of Embodiment 2.

FIG. 9 is a flow chart indicating the flow of processes of the device management system for an inverter compressor 11 according to the modification of Embodiment 2. In the flow of FIG. 9, in the case where a minimum function required by the user is not fulfilled even by performance of the fourth protective operation, the device management system performs the first protective operation.

As illustrated in FIG. 9, in step S51, the determination module 36 acquires a voltage detected by the voltmeter 41.

Next, in step S52, the determination module 36 determines whether the voltage acquired in step S51 is higher than the first threshold or not. When the determination module 36 determines that the voltage is higher than the first threshold, the processing by the determination module 36 proceeds to step S53. By contrast, when determining that the voltage is lower than or equal to the first threshold, the determination module 36 ends the flow of FIG. 9.

In step S53, the determination module 36 performs the above fourth protective operation. Specifically, the determination module 36 performs at least one of the processes (i) to (k) of the fourth protective operation.

Next, in step S54, after the first preset time period elapses, the determination module 36 re-acquires a voltage detected by the voltmeter 41.

In step S55, the determination module 36 determines whether the voltage acquired in step S54 is higher than the first threshold or not. When the determination module 36 determines that the voltage is higher than the first threshold, the processing by the determination module 36 proceeds to step S56. By contrast, when determining that the voltage is lower than or equal to the first threshold, the determination module 36 ends the flow of FIG. 9.

In step S56, the determination module 36 performs the above first protective operation. Specifically, the determination module 36 performs at least one of the processes (a) to (c) of the first protective operation.

Next, in step S57, after the first preset time period elapses, the determination module 36 re-acquires a voltage detected by the voltmeter 41.

In step S58, the determination module 36 determines whether the voltage acquired in step S57 is higher than the first threshold or not. When the determination module 36 determines that the voltage is higher than the first threshold, the processing by the determination module 36 proceeds to step S59. By contrast, when determining that the voltage is lower than or equal to the first threshold, the determination module 36 ends the flow of FIG. 9.

In step S59, the determination module 36 instructs the alarm device 51 to issue an alarm, for example, the alarm "It is expected that a failure will occur". The alarm device 51 issues the alarm to the user.

Although it is described above that in the example indicated in FIG. 9, in step S59, the determination module 36 instructs the alarm device 51 to issue an alarm, it is not limiting. For example, the determination module 36 may instruct the alarm device 51 to issue an alarm after step S53 or step S55 is carried out.

As described above, in the device management system according to Embodiment 2, when determining that a sufficient effect cannot be obtained even by the performance of the first protective operation, the determination module 36 performs the fourth protective operation to lower the winding temperature of the motor 15 or lower the temperature of the space in which the motor 15 is provided. It is therefore possible to raise the partial discharge inception voltage of the motor 15, and thus to reduce the occurrence of the partial discharge.

Furthermore, in the device management system according to the modification of Embodiment 2, when determining that a sufficient effect cannot be obtained even by the performance of the fourth protective operation, the determination module 36 performs the first protective operation. Because of the performance of the first protective operation, it is possible to cause the inverter compressor 11 to continuously operate, while preventing the occurrence of the partial discharge and maintaining a state in which the partial discharge does not occur. As a result, it is possible to prevent the dielectric breakdown or burnout of the motor 15 and avoid the spread of damage such as damage to the unit circuit of the heat-source-side unit 10.

Embodiment 3

A device management system for an inverter compressor according to Embodiment 3 will be described. In Embodiment 3, a fifth protective operation is performed instead of the third protective operation, which is described above regarding Embodiment 1. Other configurations and operations are the same as those of Embodiment 1, and their descriptions will thus be omitted.

In Embodiment 3, in the case where a minimum function required by the user is not fulfilled even by the performance of the first protective operation, the device management system performs the fifth protective operation. As described above, the partial discharge inception voltage has temperature dependence, and is featured in that the partial discharge inception voltage rises as the temperature drops. That is, the higher the temperature, the more easily a discharge occurs, and the lower the temperature, the less likely a discharge is to occur. Therefore, the fifth protective operation is performed in consideration of the above feature. In the fifth protective operation, for example, a control of lowering the temperature of the motor 15 is performed, thereby raising the partial discharge inception voltage.

As the fifth protective operation, the following processes (l) to (n) are present. To be more specific, it suffices that as the fifth protective operation, any one or more of the following processes (l) to (n) are performed. Also, it suffices that any one or more of the processes (l) to (n) are selected as appropriate by the determination module 36 or a user setting, on the basis of the characteristics and usage environment of the motor 15.

(l) The determination module 36 gives an instruction to the motor controller 32 to reduce an operating current that is made to flow through the motor 15 of the inverter compressor 11, until no current noise is detected any longer by the current sensor 42. As a result, the amount of heat that is generated by the winding of the motor 15 is reduced and the winding temperature of the motor 15 is lowered, thereby arising the partial discharge inception voltage. The determination module 36 instructs the motor controller 32 to maintain the operating current of the motor 15 at a point in time at which no current noise is detected any longer by the current sensor 42, and causes the inverter compressor 11 to continue operating.

(m) The determination module 36 gives an instruction to the temperature regulating module 65 via the refrigeration cycle controller 33 to lower the temperature of the space in which the motor 15 of the inverter compressor 11 is provided, until no current noise is detected any longer by the current sensor 42, to thereby raise the partial discharge inception voltage. The determination module 36 instructs the temperature regulating module 65 to maintain the temperature of the space at a point in time at which no current noise is detected any longer by the current sensor 42, and causes the inverter compressor 11 to continue operating.

(n) The determination module 36 gives an instruction to the motor controller 32 to raise the rotation speed of the motor 15 of the inverter compressor 11 until no current noise is detected any longer by the current sensor 42. This improves the effect of cooling the motor 15 through an increase in circulating volume of refrigerant and lowering the winding temperature of the motor 15, thereby raising the partial discharge inception voltage. The determination module 36 instructs the motor controller 32 to maintain the rotation speed of the motor 15 at a point in time at which no current noise is detected any longer by the current sensor 42, and causes the inverter compressor 11 to continue operating.

Figure 10:
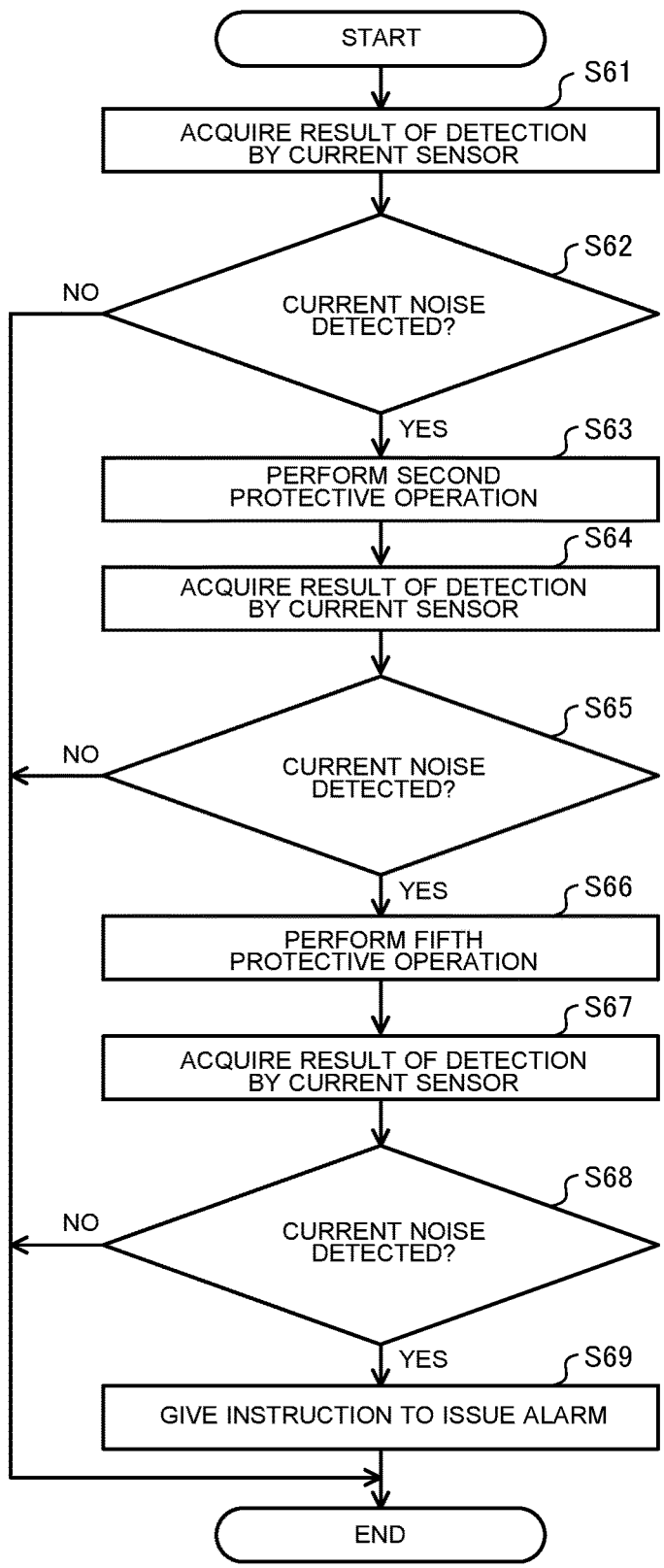
FIG. 10 is a flow chart indicating the flow of processes of a device management system for an inverter compressor 11 according to Embodiment 3.

FIG. 10 is a flow chart indicating the flow of processes of the device management system for the inverter compressor 11 according to Embodiment 3. In the flow indicated in FIG. 10, the determination module 36 uses the result of detection by the current sensor 42.

As illustrated in FIG. 10, in step S61, the determination module 36 acquires a current detected by the current sensor 42.

Next, in step S62, the determination module 36 determines whether current noise is generated or not based on the current acquired in step S61. When the determination module 36 determines that current noise is generated, the processing by the determination module 36 proceeds to step S63. By contrast, when determining that current noise is not generated, the determination module 36 ends the flow of FIG. 10.

In step S63, the determination module 36 performs the above second protective operation. Specifically, the determination module 36 performs at least one of the processes (d) to (f) of the second protective operation.

Next, in step S64, after the second preset time period elapses, the determination module 36 re-acquires a current detected by the current sensor 42.

In step S65, the determination module 36 determines whether current noise is generated or not based on the current acquired in step S64. When the determination module 36 determines that current noise is generated, the processing by the determination module 36 proceeds to step S66. By contrast, when determining that current noise is not generated, the determination module 36 ends the flow of FIG. 10 there.

In step S66, the determination module 36 performs the above fifth protective operation. Specifically, the determination module 36 performs at least one of the processes (l) to (n) of the fifth protective operation.

Next, in step S67, after the second preset time period elapses, the determination module 36 re-acquires a current detected by the current sensor 42.

In step S68, the determination module 36 determines whether current noise is generated or not based on the current acquired in step S67. When the determination module 36 determines that current noise is generated, the processing by the determination module 36 proceeds to step S69. By contrast, when determining that current noise is not generated, the determination module 36 ends the flow of FIG. 10.

In step S69, the determination module 36 instructs the alarm device 51 to issue an alarm, for example, the alarm "It is expected that a failure will occur". The alarm device 51 issues the alarm to the user.

Although it is described above that in the example indicated in FIG. 10, in step S69, the determination module 36 instructs the alarm device 51 to issue an alarm, it is not limiting. For example, the determination module 36 may instruct the alarm device 51 to issue an alarm after step S63 or step S65 is carried out.

As a modification of Embodiment 3, the second protective operation of step S63 and the fifth protective operation of step S66 may be interchanged in the flow chart of FIG. 10.

Figure 11:
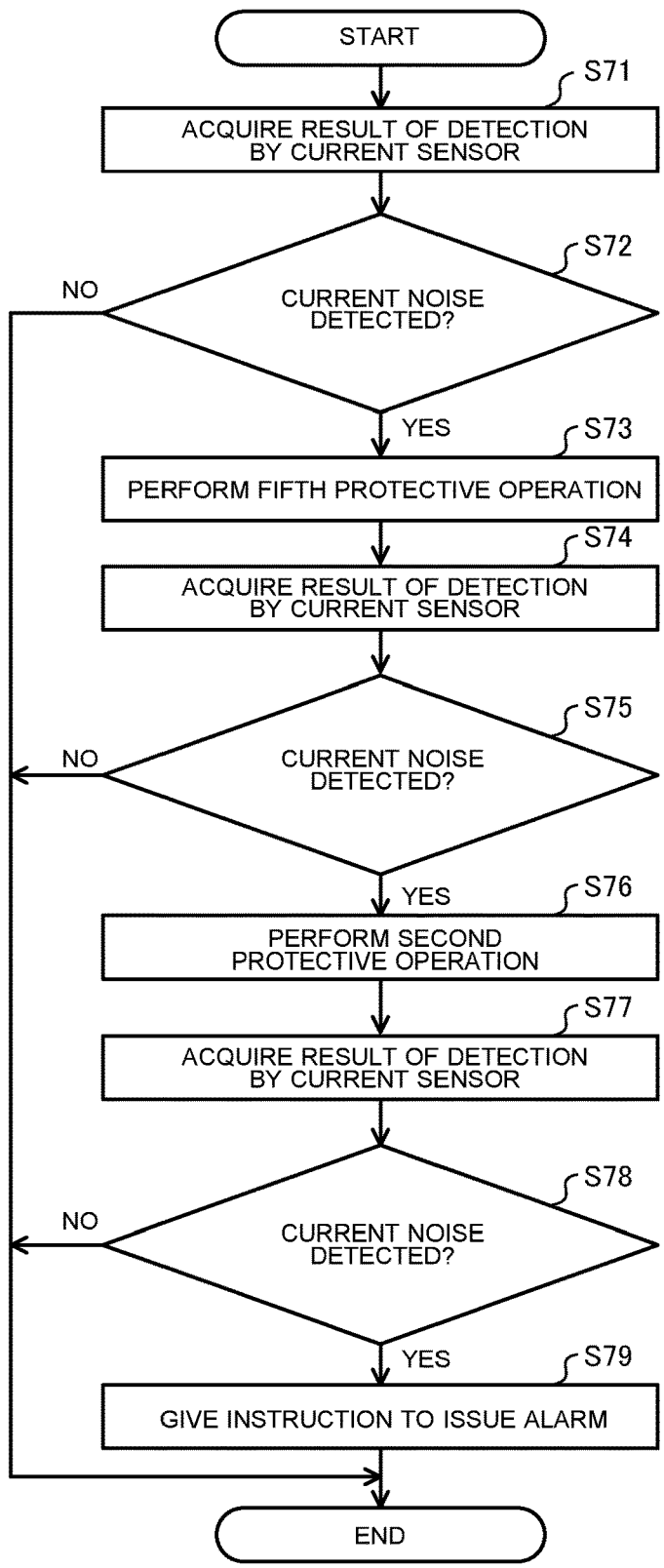
FIG. 11 is a flow chart indicating the flow of processes of a device management system for an inverter compressor 11 according to a modification of Embodiment 3.

FIG. 11 is a flow chart indicating the flow of processes of the device management system for an inverter compressor 11 according to the modification of Embodiment 3. In the modification of Embodiment 3, in the case where a minimum function required by the user is not fulfilled even by the performance of the fifth protection operation, the device management system performs the second protective operation.

As illustrated in FIG. 11, in step S71, the determination module 36 acquires a current detected by the current sensor 42.

Next, in step S72, the determination module 36 determines whether current noise is generated or not based on the current acquired in step S71. When the determination module 36 determines that current noise is generated, the processing by the determination module 36 proceeds to step S73. By contrast, when the determination module 36 determines that current noise is not generated, the determination module 36 ends the flow of FIG. 11.

In step S73, the determination module 36 performs the above fifth protective operation. Specifically, the determination module 36 performs at least one of the processes (l) to (n) of the fifth protective operation.

Next, in step S74, after the second preset time period elapses, the determination module 36 re-acquires a current detected by the current sensor 42.

In step S75, the determination module 36 determines whether current noise is generated or not based on the current acquired in step S74. When the determination module 36 determines that current noise is generated, the processing by the determination module 36 proceeds to step S76. By contrast, when determining that current noise is not generated, the determination module 36 ends the flow of FIG. 11.

In step S76, the determination module 36 performs the above second protective operation. Specifically, the determination module 36 performs at least one of the processes (d) to (f) of the second protective operation.

Next, in step S77, after the second preset time period elapses, the determination module 36 re-acquires a current detected by the current sensor 42.

In step S78, the determination module 36 determines whether current noise is generated or not based on the current acquired in step S77. When the determination module 36 determines that current noise is generated, the processing by the determination module 36 proceeds to step S79. By contrast, when the determination module 36 determines that current noise is not generated, the determination module 36 ends the flow of FIG. 11.

Next, in step S79, the determination module 36 instructs the alarm device 51 to issue an alarm, for example, the message "It is expected that a failure will occur". The alarm device 51 issues the alarm to the user the alarm.

Although it is described above that in the example indicated in FIG. 11, the determination module 36 instructs the alarm device 51 in step S79 to issue an alarm, it is not limiting. For example, the determination module 36 may instruct the alarm device 51 to issue an alarm after step S73 or step S75 is carried out.

As described above, in the device management system according to Embodiment 3, when determining that a sufficient effect cannot be obtained even by performance of the second protective operation, the determination module 36 performs the fifth protective operation to lower the winding temperature of the motor 15 or lower the temperature of the space in which the motor 15 is provided. Thus, it is possible to raise the partial discharge inception voltage of the motor 15, thus reducing the occurrence of the partial discharge.

Furthermore, in the device management system according to the modification of Embodiment 3, when determining that a sufficient effect cannot be obtained even by the performance of the fifth protective operation, the determination module 36 performs the second protective operation. Because of the performance of the second protective operation, it is possible to cause the inverter compressor 11 to continuously operate, while reducing the occurrence of the partial discharge and maintaining a state in which the partial discharge does not occur. It is therefore possible to prevent the dielectric breakdown or burnout of the motor 15 and avoid the spread of damage such as damage to the unit circuit of the heat-source-side unit 10.

Embodiment 4

A device management system for an inverter compressor according to Embodiment 4 will be described. In Embodiment 4, the fourth and fifth protective operations, which are described above regarding Embodiment 2 and 3, are performed instead of the first and second protective operations, which are described above regarding Embodiment 1. Other configurations and operations are the same as those of Embodiment 1, and their descriptions will thus be omitted.

Figure 12:
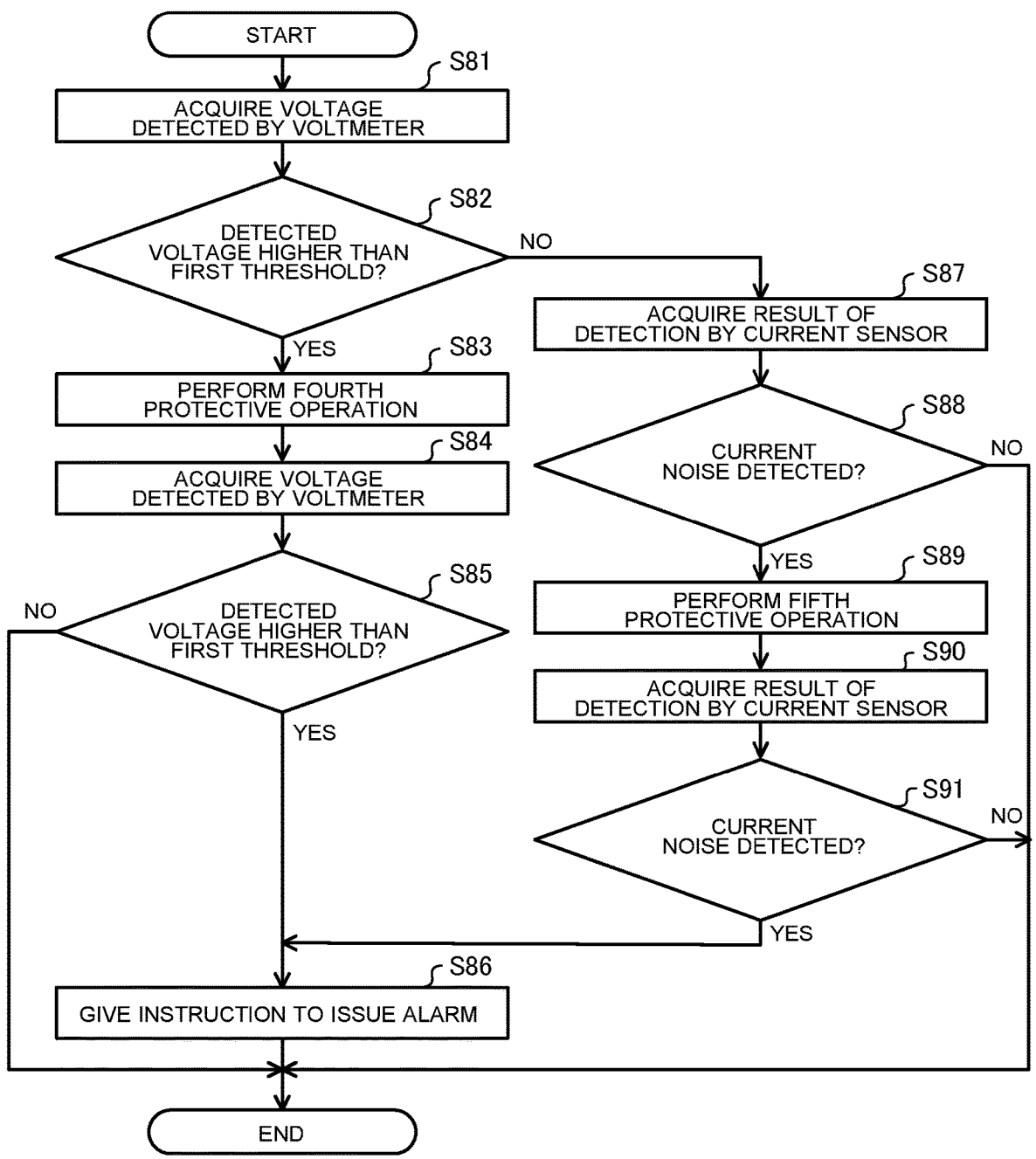
FIG. 12 is a flow chart indicating the flow of processes of a device management system for an inverter compressor 11 according to Embodiment 4.

FIG. 12 is a flow chart indicating the flow of processes of the device management system for an inverter compressor 11 according to Embodiment 4. In the flow indicated in FIG. 12, the determination module 36 uses both the result of detection by the voltmeter 41 and that of detection by the current sensor 42.

As illustrated in FIG. 12, in step S81, the determination module 36 acquires a voltage detected by the voltmeter 41.

Next, in step S82, the determination module 36 determines whether the voltage acquired in step S81 is higher than the first threshold or not. When the determination module 36 determines that the voltage is higher than the first threshold, the processing by the determination module 36 proceeds to step S83. By contrast, when the determination module 36 determines that the voltage is lower than or equal to the first threshold, the processing by the determination module 36 proceeds to step S87.

In step S83, the determination module 36 performs the above fourth protective operation. Specifically, the determination module 36 performs at least one of the processes (i) to (k) of the fourth protective operation.

Next, in step S84, after the first preset time period elapses, the determination module 36 re-acquires a voltage detected by the voltmeter 41.

In step S85, the determination module 36 determines whether the voltage acquired in step S84 is higher than the first threshold or not. When the determination module 36 determines that the voltage is higher than the first threshold, the processing by the determination module 36 proceeds to step S86. By contrast, when determining that the voltage is lower than or equal to the first threshold, the determination module 36 ends the flow of FIG. 12.

Next, in step S86, the determination module 36 instructs the alarm device 51 to issue an alarm, for example, the alarm "It is expected that a failure will occur". The alarm device 51 issues the alarm to the user.

In step S87, the determination module 36 acquires a current detected by the current sensor 42.

Next, in step S88, the determination module 36 determines whether current noise is generated or not based on the current acquired in step S87. When the determination module 36 determines that current noise is generated, the processing by the determination module 36 proceeds to step S89. By contrast, when determining that current noise is not generated, the determination module 36 ends the flow of FIG. 12.

In step S89, the determination module 36 performs the above fifth protective operation. Specifically, the determination module 36 performs at least one of the processes (l) to (n) of the fifth protective operation.

Next, in step S90, after the second preset time period elapses, the determination module 36 re-acquires a current detected by the current sensor 42.

In step S91, the determination module 36 determines whether current noise is generated or not based on the current acquired in step S90. When the determination module 36 determines that current noise is generated, the processing by the determination module 36 proceeds to step S86. By contrast, when determining that current noise is not generated, the determination module 36 ends the flow of FIG. 12.

Although it is described above that in the example indicated in FIG. 12, in step S86, the determination module 36 instructs the alarm device 51 to issue an alarm, it is not limiting. For example, the determination module 36 may instruct the alarm device 51 to issue an alarm, after step S83 and after step S89.

As described above, the device management system according to Embodiment 4 includes the partial discharge detector 14 which detects at least one of the voltage or current of the motor 15 to detect a risk of occurrence of a partial discharge that occurs inside the motor 15 or the occurrence of the partial discharge. Furthermore, the device management system according to Embodiment 4 includes the determination module 36 which determines whether there is a risk of occurrence of a partial discharge or whether the partial discharge occurs or not, based on the result of detection by the partial discharge detector 14. That is, the determination module 36 can detect a risk of occurrence of a partial discharge or the occurrence of the partial discharge.

Furthermore, in the device management system according to Embodiment 4, when determining that there is a risk of occurrence of the partial discharge or the partial discharge occurs, the determination module 36 performs the fourth protective operation or the fifth protective operation. As a result, the temperature of the motor 15 is lowered and the partial discharge inception voltage is raised. In such a manner, it is possible to cause the inverter compressor 11 to continuously operate, while maintaining a state in which the partial discharge does not occur. It is therefore possible to prevent the dielectric breakdown or burnout of the motor 15 and avoid the spread of damage such as damage to a unit circuit of the heat-source-side unit 10.

Embodiment 5

A device management system for an inverter compressor according to Embodiment 5 will be described. Embodiment 5 is a combination of the modification of Embodiment 2 and the modification of Embodiment 3. Other configurations and operations are the same as those of Embodiment 1, and their descriptions will thus be omitted.

Figure 13:
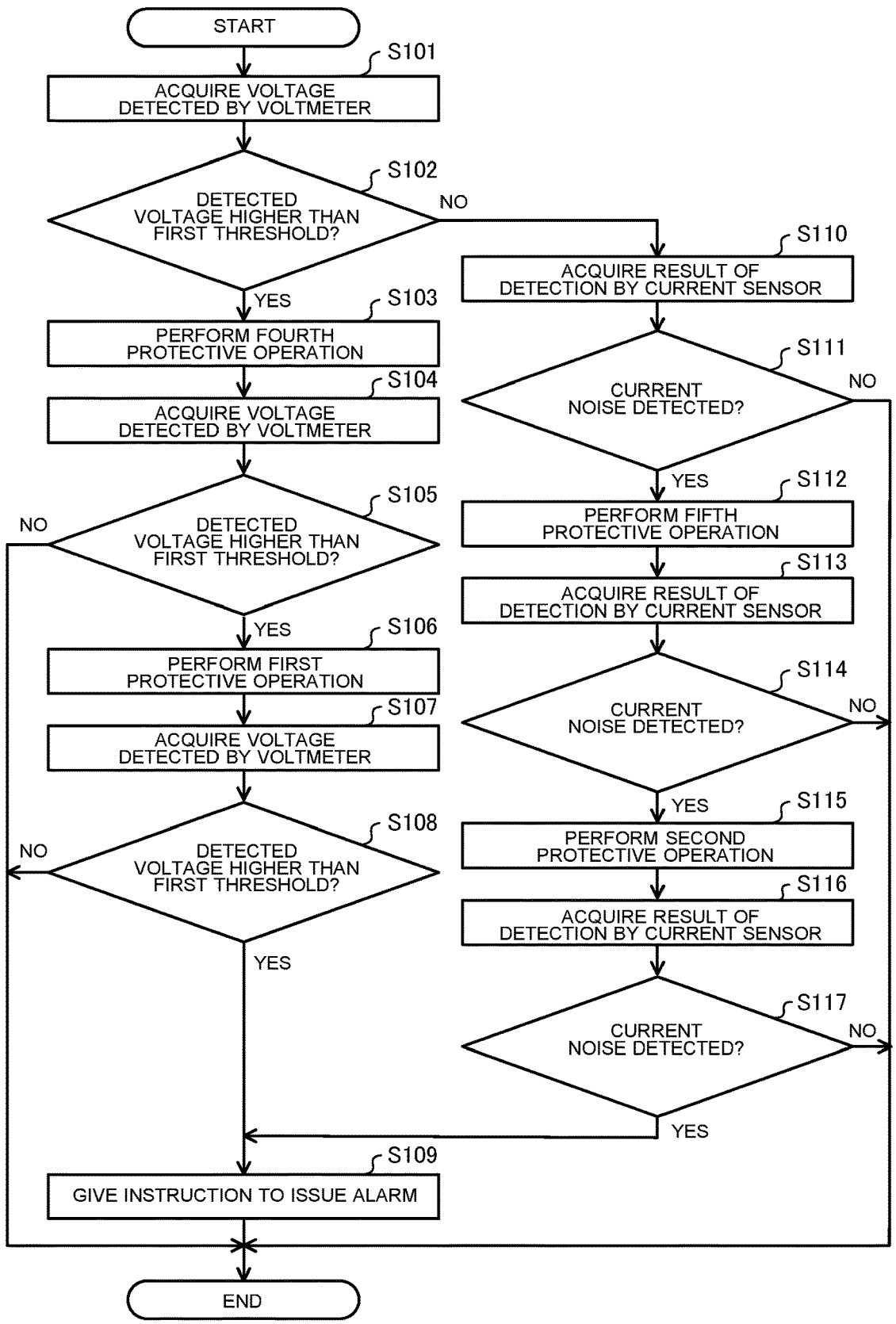
FIG. 13 is a flow chart indicating the flow of processes of a device management system for an inverter compressor 11 according to Embodiment 5.

FIG. 13 is a flow chart indicating the flow of processes of the device management system for the inverter compressor 11 according to Embodiment 5. In the flow indicated in FIG. 13, the determination module 36 uses both the result of detection by the voltmeter 41 and that of detection by the current sensor 42.

As illustrated in FIG. 13, in step S161, the determination module 36 acquires a voltage detected by the voltmeter 41.

Next, in step S102 the determination module 36 determines whether the voltage acquired in step S101 is higher than the first threshold or not. When the determination module 36 determines that the voltage is higher than the first threshold, the processing by the determination module 36 proceeds to step S103. By contrast, when the determination module 36 determines that the voltage is lower than or equal to the first threshold, the processing by the determination module 36 proceeds to step S110.

In step S103, the determination module 36 performs the above fourth protective operation. Specifically, the determination module 36 performs at least one of the processes (i) to (k) of the fourth protective operation.

Next, in step S104, after the first preset time period elapses, the determination module 36 re-acquires a voltage detected by the voltmeter 41.

In step S105, the determination module 36 determines whether the voltage acquired in step S104 is higher than the first threshold or not. When the determination module 36 determines that the voltage is higher than the first threshold, the processing by the determination module 36 proceeds to step S106. By contrast, when determining that the voltage is lower than or equal to the first threshold, the determination module 36 ends the flow of FIG. 13.

In step S106, the determination module 36 performs the above first protective operation. Specifically, the determination module 36 performs at least one of the processes (a) to (c) of the first protective operation.

Next, in step S107, after the first preset time period elapses, the determination module 36 re-acquires a voltage detected by the voltmeter 41.

In step S108, the determination module 36 determines whether the voltage acquired in step S107 is higher than the first threshold or not. When the determination module 36 determines that the voltage is higher than the first threshold; the processing by the determination module 36 proceeds to step S109. By contrast, when determining that the voltage is lower than or equal to the first threshold; the determination module 36 ends the flow of FIG. 13.

In step S109, the determination module 36 instructs the alarm device 51 to issue an alarm, for example, the alarm "It is expected that a failure will occur". The alarm device 51 issues the alarm to the user.

In step S110, the determination module 36 acquires a current detected by the current sensor 42.

In step S111, the determination module 36 determines whether current noise is generated or not based on the current acquired in step S110. When the determination module 36 determines that current noise is generated, the processing by the determination module 36 proceeds to step S112. By contrast, when determining that current noise is not generated, the determination module 36 ends the flow of FIG. 13.

In step S112, the determination module 36 performs the above fifth protective operation. Specifically, the determination module 36 performs at least one of the operation processes (l) to (n) of the fifth protective operation.

Next, in step S113, after the second preset time period elapses, the determination module 36 re-acquires a current detected by the current sensor 42.

In step S114, the determination module 36 determines whether current noise is generated or not based on the current acquired in step S113. When the determination module 36 determines that current noise is generated, the processing by the determination module 36 proceeds to step S115. By contrast, when determining that current noise is not generated, the determination module 36 ends the flow of FIG. 13.

In step S115, the determination module 36 performs the above second protective operation. Specifically, the determination module 36 performs at least one of the processes (d) to (f) of the second protective operation.

Next, in step S116, after the second preset time period elapses, the determination module 36 re-acquires a current detected by the current sensor 42.

In step S117, the determination module 36 determines whether current noise is generated or not based on the current acquired in step S116. When the determination module 36 determines that current noise is generated, the processing by the determination module 36 proceeds to step S109. By contrast, when determining that current noise is not generated, the determination module 36 ends the flow of FIG. 13.

Although it is described above that in the example indicated in FIG. 13, in step S86, the determination module 36 instructs the alarm device 51 to issue an alarm, it is not limiting. For example, the determination module 36 may instruct the alarm device 51 to issue an alarm, after step S103 and after step S112.

As described above, in Embodiment 5, the first and second protective operations described above regarding Embodiment 1 and the fourth and fifth protective operations described above regarding Embodiments 2 and 3 are performed. Therefore, in Embodiment 5, advantages equivalent to the advantages obtained in Embodiments 1 to 3 can be all obtained.

Regarding Embodiments 1 to 5, a combination of two protective operations such as a combination of the first protective operation and the third protective operation, a combination of three protective operations such as a combination of the first to third protective operations, and a combination of four protective operations such as a combination of the first to fourth protective operations are described above. In such a manner, according to the present disclosure, control using combined ones of the first to fifth protective operations may be performed. It should be noted that combined ones of the first to fifth protective operations that are other than those described above regarding Embodiments 1 to 5 may be performed. Furthermore, the number of protective operations that are combined is not limited to 2 to 4, and five or more protective operations may be combined.

In the case where control using combined ones of the first to fifth protective operations is performed, whichever protective operations are combined, the determination module 36 performs the following control. That is, after the determination module 36 starts at least one of combined protective operations, when operating time for which the at least one protective operation is performed reaches a preset time, the determination module 36 determines whether or not there is a risk of occurrence of a partial discharge or the occurrence of the partial discharge. Then, based on the result of the above determination, the determination module 36 starts, as occasion arises, another one of the combined protective operations that is other than the above at least one of the combined protective operations. In this case, that is, in the case of performing the above other protective operation, the at least one protective operation which is being performed may be stopped or may be continued.

Furthermore, in the case where control using combined ones of the first to fifth protective operations is performed, whichever protective operations are combined, the determination module 36 may perform the following control. That is, after starting at least one of the combined protective operations, the determination module 36 determines whether a value to be controlled by the at least one protective operation reaches a preset value or not. Then, based on the result of the determination whether or not there is a risk of occurrence of a partial discharge or whether the partial discharge occurs or not, at a point in time at which the determination whether the above value reaches the preset value or not is made, the determination module 36 starts, as occasion arises, another one of the combined protective operations that is other than the at least one protective operation being performed. In this case, that is, in the case of starting the above other one of the combined protective operations, the at least one protective operation being performed may be stopped or continued. It should be noted that "value to be controlled by the protective operation" corresponds to "detected voltage" in step S5, for example, in the example indicated in FIG. 5, and "preset value" corresponds to "first threshold" in step S5. Furthermore, in the example indicated in FIG. 6, "value to be controlled by the protective operation" corresponds to "result of detection by the current sensor" in step S14, and "preset value" corresponds to "detection of current noise" in step S15.

REFERENCE SIGNS LIST

1: refrigeration cycle system, 10: heat-source-side unit, 11: inverter compressor, 11a: suction port, 11b: discharge port, 12: four-way valve, 13: heat-source-side heat exchanger, 14: partial discharge detector, 15: motor, 16: housing, 20: load-side unit, 21: expansion device, 22: load-side heat exchanger, 23: room temperature sensor, 24: fan, 25: pressure sensor, 30: controller, 32: motor controller, 33: refrigeration cycle controller, 36: determination module; 37: storage module, 40: refrigerant circuit, 41: voltmeter, 42: current sensor, 43: inverter, 51: alarm device, 55: step-down switching element, 62: power supply line, 63: signal line, 64: pressure regulating module, 65: temperature regulating module, 401: three-phase AC power supply, 402: three-phase rectifier, 402a: rectifier diode element, 403: step-down circuit, 403a: main electrolytic capacitor, 403b: step-down switching element, 403c: reactor, 403d: backflow prevention element, 403e: smoothing capacitor, 403f: voltage detection device, 404: inverter circuit, 404a: switching element

The invention claimed is:

1. A device management system for an inverter compressor provided with a motor configured to be driven by an inverter, the device management system comprising:

a partial discharge detector configured to detect a voltage of the motor to detect a partial discharge that occurs in the motor;

a determination module configured to determine whether there is a risk of occurrence of the partial discharge or not, or whether the partial discharge occurs or not based on a result of detection by the partial discharge detector, wherein when the voltage detected by the partial discharge detector is higher than a first threshold, the determination module determines that there is a risk of the occurrence of the partial discharge or the partial discharge occurs, and performs a protective operation to reduce the risk of the occurrence of the partial discharge in the motor or the occurrence of the partial discharge in the motor;

a pressure sensor configured to detect a pressure of refrigerant in a refrigerate pipe on a suction side or a discharge side of the inverter compressor; and a storage module storing a data table indicating the first threshold for each of pressures of the refrigerant each of which is detected by the pressure sensor, wherein the determination module is configured to extract the first threshold associated with the pressure from the data table based on the pressure of the refrigerant that is detected by the pressure sensor, and use the first threshold.

2. The device management system of claim 1, wherein when the partial discharge starts to occur in the motor in a case where a surge voltage that is caused by a switching operation of a switching element provided in the inverter exceeds a partial discharge inception voltage that is one of characteristic values of the motor, the first threshold is set to a value equal to the partial discharge inception voltage or a value lower than the partial discharge inception voltage.

3. The device management system of claim 1, wherein
the partial discharge detector is configured to detect a current of the motor to detect a partial discharge that occurs in the motor, and
when the voltage detected by the partial discharge detector is lower than or equal to the first threshold, and then when current noise is detected in the current detected by the partial discharge detector, the determination module determines that the partial discharge occurs and performs a protective operation to reduce the occurrence of the partial discharge in the motor.

4. The device management system of claim 1, further comprising a motor controller configured to control driving of the motor by performing control of operation of the inverter,
wherein the determination module is configured to reduce, as the protective operation, the occurrence of the partial discharge by decreasing at least one of a bus voltage of the inverter or a frequency of the voltage of the motor.

5. The device management system of claim 1, further comprising a pressure regulating module configured to regulate a pressure in a space in which the motor is provided,
wherein the determination module is configured to reduce, as the protective operation, the occurrence of the partial discharge by raising the pressure in the space in which the motor is provided.

6. The device management system of claim 1, further comprising a motor controller configured to control driving of the motor by performing control of operation of the inverter,
wherein the determination module is configured to reduce, as the protective operation, at least one of the occurrence of the partial discharge and deterioration of a winding by lowering a winding temperature of the motor, the winding temperature of the motor being lowered by either decreasing an operating current that is made to flow through the motor or increasing a rotation speed of the motor.

7. The device management system of claim 1, further comprising a temperature regulating module configured to regulate a temperature of a space in which the motor is provided,
wherein the determination module is configured to reduce, as the protective operation, at least one of the occurrence of the partial discharge and deterioration of a winding by lowering the temperature of the space in which the motor is provided.

8. The device management system of claim 1, wherein the determination module is configured to continue the protective operation until the determination module determines that there is not the risk of the occurrence of the partial discharge or the partial discharge does not occur, and at a point in time at which the determination module determines that there is not the risk of the occurrence of the partial discharge or the partial discharge does not occur, maintain control that is performed at the point in time.

9. The device management system of claim 1, wherein in a case where control using combined ones of a plurality of protective operations including the protective operation is performed, the determination module makes a determination whether there is the risk of occurrence of the partial discharge or not or whether the partial discharge occurs or not, after starting at least one of the combined protective operations and at a point in time at which an operating time for which the at least one protective operation that is started is performed reaches a preset time period, and based on a result of the determination, the determination module starts another one of the combined protective operations that is other than the at least one protective operation that is started.

10. The device management system of claim 1, wherein in a case where control using combined ones of a plurality of protective operations including the protective operation is performed, the determination module makes a determination whether there is the risk of occurrence of the partial discharge or not or whether the partial discharge occurs, after starting at least one of the combined protective operations and at a point in time at which a value to be controlled by the at least one protective operation that is started reaches a preset value, and based on a result of the determination, the determination module starts another one of the combined protective operations that is other than the at least one protective operation that is started.

* * * * *